(12) United States Patent
Hongo et al.

(10) Patent No.: US 12,122,924 B2
(45) Date of Patent: Oct. 22, 2024

(54) INKJET INK COMPOSITION AND IMAGE RECORDING METHOD

(71) Applicant: FUJIFILM Corporation, Tokyo (JP)

(72) Inventors: Yushi Hongo, Kanagawa (JP); Ryuji Shinohara, Kanagawa (JP); Hiroshi Yamamoto, Kanagawa (JP); Masaharu Kawai, Kanagawa (JP); Taiga Mizoe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 640 days.

(21) Appl. No.: 17/239,679

(22) Filed: Apr. 25, 2021

(65) Prior Publication Data

US 2021/0246323 A1 Aug. 12, 2021

Related U.S. Application Data

(63) Continuation of application No. PCT/JP2019/042710, filed on Oct. 31, 2019.

(30) Foreign Application Priority Data

Nov. 30, 2018 (JP) ................. 2018-225803

(51) Int. Cl.
| | | |
|---|---|---|
| C09D 11/107 | (2014.01) | |
| B41M 5/00 | (2006.01) | |
| C09D 11/104 | (2014.01) | |
| C09D 11/322 | (2014.01) | |
| C09D 11/36 | (2014.01) | |

(52) U.S. Cl.
CPC ......... *C09D 11/107* (2013.01); *B41M 5/0023* (2013.01); *C09D 11/104* (2013.01); *C09D 11/322* (2013.01); *C09D 11/36* (2013.01)

(58) Field of Classification Search
CPC ... C09D 11/107; C09D 11/104; C09D 11/322; C09D 11/36; B41J 2/01; B41M 5/0023
See application file for complete search history.

(56) References Cited

U.S. PATENT DOCUMENTS

| | | | |
|---|---|---|---|
| 8,777,392 | B2 | 7/2014 | Ohya et al. |
| 11,352,516 | B2 | 6/2022 | Yoda et al. |
| 2013/0187998 | A1 | 7/2013 | Ohmoto |
| 2016/0152845 | A1* | 6/2016 | Okada .................. C09D 11/322 524/386 |
| 2016/0264807 | A1 | 9/2016 | Sagara et al. |
| 2016/0333209 | A1 | 11/2016 | Shimono et al. |
| 2017/0158892 | A1 | 6/2017 | Takahashi et al. |
| 2018/0030300 | A1 | 2/2018 | Ohta |
| 2018/0127610 | A1 | 5/2018 | Kido et al. |
| 2018/0281404 | A1 | 10/2018 | Kagata et al. |
| 2019/0345356 | A1 | 11/2019 | Kido et al. |

FOREIGN PATENT DOCUMENTS

| | | |
|---|---|---|
| CN | 107922769 | 4/2018 |
| CN | 108656750 | 10/2018 |
| JP | 2002249698 | 9/2002 |
| JP | 2013166364 | 8/2013 |
| JP | 2016210954 | 12/2016 |
| JP | 6111747 | 4/2017 |
| JP | 2017101212 | 6/2017 |
| JP | 2017170651 | 9/2017 |
| JP | 2017186472 | 10/2017 |
| JP | 2018015968 | 2/2018 |
| JP | 2018126953 | 8/2018 |
| JP | 2018165313 | 10/2018 |
| JP | 6424413 | 11/2018 |
| WO | 2010123064 | 10/2010 |
| WO | 2016199391 | 12/2016 |

OTHER PUBLICATIONS

"International Search Report (Form PCT/ISA/210) of PCT/JP2019/042710," mailed on Dec. 10, 2019, with English translation thereof, pp. 1-5.
"Written Opinion of The International Searching Authority (Form PCT/ISA/237) of PCT/JP2019/042710," mailed on Dec. 10, 2019, with English translation thereof, pp. 1-17.
"Office Action of China Counterpart Application", issued on Jan. 18, 2023, with English translation thereof, pp. 1-21.
Office Action of Japan Counterpart Application, with English translation thereof, issued on May 24, 2022, pp. 1-10.
Office Action of China Counterpart Application, with English translation thereof, issued on Apr. 21, 2022, pp. 1-23.
Office Action of China Counterpart Application, with English translation thereof, issued on Sep. 28, 2022, pp. 1-21.
"Decision of Refusal of China Counterpart Application", issued on Jun. 29, 2023, with English translation thereof, p. 1-p. 25.
"Search Report of Europe Counterpart Application", issued on Jan. 3, 2022, pp. 1-6.
"Notice of Reasons for Cancelation of Japan Counterpart Application", issued on Nov. 20, 2023, with English translation thereof, p. 1-p. 129.
Toshinao Okitsu, "The Role of Solubility Parameter (SP) in Solubility Theories Part 1, Method for Estimating Solubility Parameters SP by Means of Molar Attraction Constants", Journal of the Adhesion Society of Japan, vol. 29, Nov. 1992, pp. 1-14, with concise explanation of relevance from English translation of Notice of Reasons for Cancelation of Japan Counterpart Application.
Robert F. Fedors, "A Method for Estimating Both the Solubility Parameters and Molar Volumes of Liquids", Polymer Engineering and Science, vol. 14, Feb. 1974, pp. 147-154.

(Continued)

*Primary Examiner* — Thinh H Nguyen
(74) *Attorney, Agent, or Firm* — JCIPRNET

(57) ABSTRACT

An inkjet ink composition includes water (A), a resin (B), and an organic solvent (C) which has a boiling point of 250° C. or lower, satisfies Expression (C1), and has a nitrogen atom, in which a content mass ratio of the organic solvent (C) to a main resin in the resin (B) is 0.01 or greater and less than 2.0. In Expression (C1), $SP_B$ represents an SP value of the main resin in the resin (B) in a unit of $MPa^{1/2}$, $SP_C$ represents an SP value of the organic solvent (C) in the unit of $MPa^{1/2}$, and $|SP_C-SP_B|$ represents an absolute value of a difference between $SP_C$ and $SP_B$.

$$|SP_C - SP_B| \leq 10.0 \qquad \text{Expression (C1)}$$

9 Claims, No Drawings

(56) References Cited

OTHER PUBLICATIONS

Unknown, "CAS Registry No. 25084-34-1", American Chemical Society, unknown date, pp. 1-2.
"Notice of Reasons for Cancellation of Japan Counterpart Application", issued on Aug. 2, 2024, with English translation thereof, p. 1-p. 100.
Toshinao Okitsu, "Romance and Story of Adhesion[34]-Development of Solubility Theory", Polymer Publishing Association, vol. 40, Aug. 1996, with concise English explanation of relevance from Notice of Reasons for Cancellation of Japan Counterpart Application, pp. 1-14.

* cited by examiner

INKJET INK COMPOSITION AND IMAGE RECORDING METHOD

CROSS-REFERENCE TO RELATED APPLICATIONS

This application is a Continuation of PCT International Application No. PCT/JP2019/042710 filed on Oct. 31, 2019, which claims priority under 35 U.S.C § 119(a) to Japanese Patent Application No. 2018-225803 filed on Nov. 30, 2018. Each of the above application(s) is hereby expressly incorporated by reference, in its entirety, into the present application.

BACKGROUND OF THE INVENTION

1. Field of the Invention

The present disclosure relates to an inkjet ink composition and an image recording method.

2. Description of the Related Art

In the related art, various examinations have been conducted on inks used for recording images.

Further, JP2017-186472A discloses, as an aqueous inkjet ink composition which has excellent clogging resistance in a head and is capable of forming an image having excellent rub resistance, an aqueous inkjet ink composition containing a resin, a nitrogen-containing solvent in which a difference in SP value between the resin and the solvent is 3 or less, and water, in which the content of the nitrogen-containing solvent is in a range of 2 to 9 parts by mass with respect to 1 part by mass of the resin, and the content of the organic solvent having a standard boiling point of 280° C. or higher is 3% by mass or less.

SUMMARY OF THE INVENTION

However, an image to be recorded by an inkjet ink may be required to further improve the rub resistance.

Based on the examination conducted by the present inventors, it was found that in a case where the composition of the inkjet ink is set as a composition for improving the rub resistance of an image to be recorded on an impermeable base material, the removability in a case of removing the inkjet ink attached to a nozzle surface of an ink jet head (that is, a surface on a side where the inkjet ink is jetted) may be degraded. The reason for this is considered to be that while the rub resistance is improved due to an increase in intensity of the image to be recorded on the impermeable base material, the inkjet ink is firmly attached to the nozzle surface of the ink jet head and thus unlikely to be removed.

Meanwhile, it was found that in a case where the composition of the inkjet ink is set as a composition for improving the removability from the nozzle surface, the rub resistance may be insufficient due to insufficient intensity of the image to be recorded on the impermeable base material while the inkjet ink is likely to be removed from the nozzle surface.

Therefore, achievement of both the rub resistance of an image to be formed on the impermeable base material and the removability of the inkjet ink from the nozzle surface of the ink jet head may be required.

The present disclosure has been made in consideration of the above-described circumstances.

An object of one aspect of the present disclosure is to provide an inkjet ink composition and an image recording method, in which both the rub resistance of an image to be recorded on an impermeable base material and the removability of the inkjet ink composition from a nozzle surface of an ink jet head are achieved.

Specific means for achieving the above-described objects includes the following aspects.

<1> An inkjet ink composition which is used for recording an image on an impermeable base material, the inkjet ink composition comprising: water (A); a resin (B); and an organic solvent (C) which has a boiling point of 250° C. or lower, satisfies Expression (C1), and has a nitrogen atom, in which a content mass ratio of the organic solvent (C) to a main resin in the resin (B) is 0.01 or greater and less than 2.0.

$$|SP_C - SP_B| \leq 10.0 \qquad \text{Expression (C1)}$$

In Expression (C1), $SP_B$ represents an SP value of a main resin in the resin (B) in a unit of $MPa^{1/2}$, $SP_C$ represents an SP value of the organic solvent (C) in the unit of $MPa^{1/2}$, and $|SP_C - SP_B|$ represents an absolute value of a difference between $SP_C$ and $SP_B$.

<2> The inkjet ink composition according to <1>, in which the organic solvent (C) has a boiling point of 200° C. or lower.

<3> The inkjet ink composition according to <1> or <2>, in which the content mass ratio of the organic solvent (C) to the main resin in the resin (B) is in a range of 0.01 to 1.0.

<4> The inkjet ink composition according to any one of <1> to <3>, in which $|SP_C - SP_B|$ is 5.0 or less.

<5> The inkjet ink composition according to any one of <1> to <4>, in which the organic solvent (C) further contains a hydroxyl group.

<6> The inkjet ink composition according to any one of <1> to <5>, in which the resin (B) contains resin particles.

<7> The inkjet ink composition according to any one of <1> to <6>, further comprising: an organic solvent (D) which has no nitrogen atom and satisfies Expression (D1).

$$|SP_D - SP_{CM}| \leq 5.0 \qquad \text{Expression (D1)}$$

In Expression (D1), $SP_{CM}$ represents an SP value of a main organic solvent in the organic solvent (C) in the unit of $MPa^{1/2}$, $SP_D$ represents an SP value of the organic solvent (D) in the unit of $MPa^{1/2}$, and $|SP_D - SP_{CM}|$ represents an absolute value of a difference between $SP_D$ and $SP_{CM}$.

<8> The inkjet ink composition according to any one of <1> to <7>, further comprising: a colorant.

<9> An image recording method comprising: recording an image by jetting and applying the inkjet ink composition according to any one of <1> to <8> onto an impermeable base material from an ink jet head; and
   removing the inkjet ink composition attached to a surface of the ink jet head from which the inkjet ink composition is jetted.

According to one aspect of the present disclosure, it is possible to provide an inkjet ink composition and an image recording method, in which both the rub resistance of an image to be recorded on an impermeable base material and the removability of the inkjet ink composition from a nozzle surface of an ink jet head are achieved.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, the "image" indicates a whole film to be formed using an inkjet ink composition, and the "recording of an image" and the "image recording" respectively indicate formation of a film and film formation. Therefore, the "image" in the present disclosure is not limited to a colored film and may be, for example, a transparent film. Here, the transparency of a film indicates that the transmittance of visible light having a wavelength of 400 nm to 700 nm is 80% or greater (preferably 90% or greater).

Further, the concept of "image" in the present disclosure also includes a solid image.

[Inkjet Ink Composition]

An inkjet ink composition according to the embodiment of the present disclosure (hereinafter, also simply referred to as an "ink") is an inkjet ink composition which is used for recording an image on an impermeable base material, the inkjet ink composition including water (A), a resin (B), and an organic solvent (C) which has a boiling point of 250° C. or lower, has a nitrogen atom, and satisfies Expression (C1), in which a content mass ratio of the organic solvent (C) to a main resin in the resin (B) is 0.01 or greater and less than 2.0.

$|SP_C - SP_B| \leq 10.0$      Expression (C1)

In Expression (C1), $SP_B$ represents an SP value of a main resin in the resin (B) in a unit of MPa$^{1/2}$, $SP_C$ represents an SP value of the organic solvent (C) in the unit of MPa$^{1/2}$, and $|SP_C - SP_B|$ represents an absolute value of a difference between $SP_C$ and $SP_B$.

In the present disclosure, the term "SP value" simply indicates the SP value in the unit of MPa$^{1/2}$.

The SP (solubility parameter) value in the present disclosure is a value calculated by the Okitsu method ("Journal of the Adhesion Society of Japan", written by Toshinao Okitsu, 29(5) (1993)).

Specifically, the SP value is calculated by the following equation. Further, ΔF is a value described in the literatures.

SP value $(\delta) = \Sigma \Delta F$(Molar Attraction Constants)/$V$ (molar volume)

Further, in the present disclosure, the "main resin in the resin (B)" indicates a resin having the largest content mass with respect to the entire ink among all the resins contained in the ink.

The number of kinds of the main resins in the resin (B) is not limited to one and may be two or more. For example, in a case where the resin (B) is formed of a resin X, a resin Y, and a resin Z, the content mass of the resin X is the same as the content mass of the resin Y, and the content mass of the resin X and the content mass of the resin Y are respectively greater than the content mass of the resin Z, the main resins in the resin (B) are two kinds of resins, which are the resin X and the resin Y. In a case where two or more main resins are present in the resin (B), the organic solvent (C) is an organic solvent which satisfies Expression (C1) with respect to all the main resins, has a boiling point of 250° C. or lower, and has a nitrogen atom.

$SP_B$ of the main resin is acquired by weight-averaging the SP values of the respective constitutional units constituting the main resin according to the content mass thereof in the main resin.

More specifically, the SP value of the main resin (that is, $SP_B$) is a value acquired as X by substituting the SP value of an i-type (i represents an integer of 1 or greater) constitutional unit in the main resin for Si and substituting the content mass of the i-type constitutional unit in the main resin for Wi in Mathematical Formula 1.

[Mathematical Formula 1]

$$X = \frac{\sum S_i W_i}{\sum W i}$$      (Mathematical Formula 1)

As the SP value of the constitutional unit, the SP value of the compound for forming the constitutional unit is employed.

For example, the SP value of a resin a formed of a compound A (10% by mass) having an SP value of 15 MPa$^{1/2}$, a compound B (20% by mass) having an SP value of 18 MPa$^{1/2}$, and a compound C (70% by mass) having an SP value of 20 MPa$^{1/2}$ as raw materials is acquired by the following equation.

SP value of resin a (MPa$^{1/2}$)=(15 MPa$^{1/2}$×10+18 MPa$^{1/2}$×20+20 MPa$^{1/2}$×70)/(10+20+70)=19.1 MPa$^{1/2}$ The constitutional units in the main resin are identified by thermal analysis gas chromatography.

The analysis of the content mass of the constitutional units in the main resin is performed by nuclear magnetic resonance (NMR).

Further, in the present disclosure, the content mass ratio of the organic solvent (C) to the main resin in the resin (B) indicates a value obtained by dividing the content mass of the organic solvent (C) in the ink by the content mass of the main resin in the resin (B) in the ink (that is, the ratio [content mass of organic solvent (C) in ink/content mass of main resin in resin (B) in ink]).

Hereinafter, the content mass ratio of the organic solvent (C) to the main resin in the resin (B) will also be referred to as the "content mass ratio [organic solvent (C)/main resin in resin (B)]".

According to the ink according to the embodiment of the present disclosure, both the rub resistance of the image to be recorded on the impermeable base material and the removability of the ink attached to the nozzle surface (that is, the surface from which the ink is jetted) of the ink jet head are achieved.

The reason why such an effect is exhibited is assumed as follows. However, the ink according to the embodiment of the present disclosure is not limited to the following reason.

The fact that the ink contains the resin (B), the absolute value (that is, $|SP_C - SP_B|$) of the difference between the SP value (that is, $SP_B$) of the main resin in the resin (B) and the SP value (that is, $SP_C$) of the organic solvent (C) is 10.0 or less, and the content mass ratio [the organic solvent (C)/the main resin in the resin (B)] is 0.01 or greater and less than 2.0 is considered to contribute to the effect of the rub resistance of the image.

Specifically, it is considered that since the ink contains the resin (B), film formation is easily made by the ink applied onto the impermeable base material. Based on this premise, it is considered that since $|SP_C-SP_B|$ is 10.0 or less and the content mass ratio [the organic solvent (C)/the main resin in the resin (B)] is 0.01 or greater, the film-forming property of the ink on the impermeable base material is further enhanced, and thus a hard film (that is, an image having excellent rub resistance) is formed on the impermeable base material.

Further, it is considered that since the content mass ratio [the organic solvent (C)/the main resin in the resin (B)] is less than 2.0, remaining of the organic solvent (C) in the ink on the impermeable base material is suppressed, and thus degradation of the rub resistance of the image due to remaining of the organic solvent (C) is suppressed. In addition, the organic solvent (C) having a nitrogen atom has a moisturizing effect. It is considered that in a case where the amount of the organic solvent (C) having a moisturizing effect is limited to some extent (specifically, the content mass ratio [the organic solvent (C)/the main resin in the resin (B)] is set to less than 2.0), remaining of the organic solvent (C) in the ink on the impermeable base material is suppressed.

Further, the fact that the boiling point of the organic solvent (C) is 250° C. or lower is considered to also contribute to the effect of the rub resistance of the image.

That is, it is considered that since the boiling point of the organic solvent (C) is 250° C. or lower, the drying properties of the image recorded on the impermeable base material are improved, and degradation of the rub resistance of the image due to the insufficiently dried image (specifically, remaining of the organic solvent (C) in the image) is suppressed.

Further, the fact that the organic solvent (C) has a nitrogen atom and the content mass ratio [the organic solvent (C)/the main resin in the resin (B)] is 0.01 or greater and less than 2.0 is considered to contribute to the effect of the removability of the inkjet ink from the nozzle surface of the ink jet head.

Specifically, since the organic solvent (C) has a nitrogen atom in a molecule, the organic solvent (C) has a moisturizing effect. Based on this premise, it is considered that in a case where the content mass ratio [the organic solvent (C)/the main resin in the resin (B)] is 0.01 or greater, the removability of the inkjet ink from the nozzle surface is improved.

Further, it is considered that in a case where the content mass ratio [the organic solvent (C)/the main resin in the resin (B)] is less than 2.0, the excessive film-forming property of the ink is suppressed. In this manner, it is considered that attachment of the ink to the nozzle surface is suppressed, and thus degradation of the removability due to the attachment of the ink is suppressed.

In other words, it is considered that in the ink according to the embodiment of the present disclosure, the film-forming property of the ink is enhanced to some extent in order to improve the rub resistance of the image while the excessive film-forming property of the ink is suppressed in order to improve the removability of the ink from the nozzle surface. That is, it is considered that the ink according to the embodiment of the present disclosure has a moderate degree of the film-forming property that is not extremely enhanced nor extremely degraded. In this manner, it is considered that both the rub resistance of the image to be recorded on the impermeable base material and the removability of the ink attached to the nozzle surface (that is, the surface from which the ink is jetted) of the ink jet head are achieved.

In the present disclosure, examples of the method of removing the ink from the nozzle surface of the ink jet head include a method of removing the ink with a liquid, a method of removing the ink with cloth, paper, a wiper blade, or the like, and a method of combining these methods.

Even in a case where the ink is removed by any of the methods, the above-described effect of improving the removability of the ink removability is exhibited.

Preferred embodiments of the method of removing the ink from the nozzle surface of the ink jet head will be described below.

Hereinafter, each component that can be contained in the ink according to the embodiment of the present disclosure will be described.

<Water (A)>

The ink according to the embodiment of the present disclosure contains water (A).

That is, the ink according to the embodiment of the present disclosure is a so-called aqueous ink.

The content of water (A) is preferably 50% by mass or greater and more preferably 60% by mass or greater with respect to the total amount of the ink.

The upper limit of the content of water (A) is appropriately determined according to the content of other components. The upper limit of the content of water (A) may be 90% by mass, 80% by mass, or the like.

<Resin (B)>

The ink of the present disclosure contains the resin (B).

Here, the resin (B) indicates the entire resin component contained in the ink.

The kind of resin (B) is not particularly limited.

Examples of the resin (B) include an acrylic resin, a polyester resin, a urethane resin, and an olefin resin.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

Further, in the present disclosure, the polyester resin indicates a polymer compound having an ester bond in the main chain. Examples of the polyester resin include a polycondensate of polyvalent carboxylic acid (such as dicarboxylic acid) and polyalcohol (such as a diol).

Further, in the present disclosure, the urethane resin indicates a polymer compound having a urethane bond in the main chain.

Further, in the present disclosure, the olefin resin indicates a polymer (a homopolymer or a copolymer) of a raw material monomer containing an olefin. Examples of the olefin resin include a polymer of one kind of olefin, a copolymer of two or more kinds of olefins, and a copolymer of one or more kinds of olefins and one or more kinds of other monomers. Examples of the olefin include an α-olefin having 2 to 30 carbon atoms.

The weight-average molecular weight ($M_W$) of the resin (B) is preferably in a range of 3000 to 500000, more preferably in a range of 3000 to 200000, still more preferably in a range of 3000 to 100000, even still more preferably in a range of 5000 to 80000, and even still more preferably in a range of 8000 to 60000.

The weight-average molecular weight ($M_w$) of the acrylic resin is preferably in a range of 3000 to 100000, more preferably in a range of 5000 to 80000, and still more preferably in a range of 8000 to 60000.

The weight-average molecular weight ($M_w$) of the polyester resin is preferably in a range of 3000 to 200000, more preferably in a range of 4000 to 150000, still more preferably in a range of 5000 to 100000.

The weight-average molecular weight ($M_w$) of the urethane resin is preferably in a range of 3000 to 500000, more preferably in a range of 4000 to 300000, and still more preferably in a range of 5000 to 200000.

The weight-average molecular weight ($M_w$) of the olefin resin is preferably in a range of 3000 to 100000, more preferably in a range of 3000 to 50000, and still more preferably in a range of 7000 to 20000.

In the present disclosure, the weight-average molecular weight ($M_w$) indicates a value measured according to gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 µl, and a measurement temperature of 40° C. using an RI detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

Specific examples of the resin (B) include resin particles which are particles formed of a resin, and a pigment dispersion resin for covering at least a part of a pigment to disperse the pigment.

It is preferable that the resin (B) contains at least one kind of resin particles.

In a case where the resin (B) contains resin particles, the removability of the ink from the nozzle surface is further improved. The reason for this is considered to be that in a case where the resin (B) contains resin particles, the attachment of the ink to the nozzle surface due to the excessive film-forming property of the ink is suppressed.

In a case where the resin (B) contains resin particles, the resin (B) may further contain at least one pigment dispersion resin.

In a case where the resin (B) contains resin particles, the proportion of the resin particles in the resin (B) is preferably greater than 50% by mass, more preferably 60% by mass or greater, and still more preferably 80% by mass or greater.

The resin particles may contain one or two or more kinds of resins.

It is preferable that the resin particles that may be contained in the resin (B) include the main resin in the resin (B) (that is, the resin having the largest content mass in the resin (B)).

It is preferable that the resin contained in the resin particles is a water-insoluble resin.

In the present disclosure, the term "water-insoluble" in a water-insoluble resin indicates a property that the amount of a substance to be dissolved in 100 g of water at 25° C. is less than 1.0 g (more preferably less than 0.5 g).

The volume average particle diameter of the resin particles is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering particle size distribution analyzer.

As a measuring device, a particle size distribution measuring device "MICROTRAC MT-3300II" (manufactured by Nikkiso Co., Ltd.) is exemplified.

In regard to the resin particles, for example, as an example of particles formed of an acrylic resin, the description in paragraphs 0137 to 0171 of WO2017/163738A and the description in paragraphs 0036 to 0081 of JP2010-077218A may be referred to.

From the viewpoint of improving the adhesiveness of an image to be obtained, the glass transition temperature (Tg) of the resin contained in the resin particles is preferably 100° C. or lower and more preferably 75° C. or lower.

In the present disclosure, the glass transition temperature of the resin indicates a value measured using differential scanning calorimetry (DSC).

Specifically, the glass transition temperature is measured in conformity with the method described in JIS K 7121 (1987) or JIS K 6240 (2011).

The glass transition temperature in the present disclosure is an extrapolated glass transition start temperature (hereinafter, also referred to as Tig).

The method of measuring the glass transition temperature will be described in more detail.

In a case where the glass transition temperature is acquired, the resin is maintained at a temperature lower than the expected glass transition temperature of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature in the present specification is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

Further, in a case where the resin particles contain two or more kinds of resins, the glass transition temperature (Tg) of the resin particles indicates the weighted average value of the glass transition temperatures of the respective resins.

The resin contained in the resin particles has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of further improving the dispersibility of the resin particles in water, it is preferable that the resin contained in the resin particles contains an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is preferably in a range of 0.001 mol to 1.0 mol and more preferably in a range of 0.01 mol to 0.5 mol, for example, per 100 g of the resin contained in the resin particles.

The total content of the resin (B) is preferably in a range of 0.5% by mass to 10.0% by mass, more preferably in a range of 1.0% by mass to 8.0% by mass, and still more preferably 2.5% by mass to 7.0% by mass with respect to the total amount of the ink.

The SP value of the main resin in the resin (B) (that is, $SP_B$) is not particularly limited as long as the SP value satisfies Expression (C1).

$SP_B$ is preferably in a range of 10.0 to 30.0.

$SP_B$ is more preferably 26.0 or less and still more preferably 22.0 or less.

$SP_B$ is more preferably 15.0 or greater and still more preferably 18.0 or greater.

<Organic Solvent (C)>

The ink according to the embodiment of the present disclosure contains an organic solvent (C).

The organic solvent (C) is an organic solvent which has a boiling point of 250° C. or lower, has a nitrogen atom, and satisfies Expression (C1) (that is, $|SP_C-SP_B|\leq 10.0$).

The ink according to the embodiment of the present disclosure may contain only one or two or more kinds of organic solvents (C).

In the present disclosure, the "boiling point" indicates a boiling point at 1 atm (101325 Pa).

The fact that the boiling point of the organic solvent (C) is 250° C. or lower contributes to improvement of the drying properties of the image and to improvement of the rub resistance of the image (that is, suppression of degradation of the rub resistance due to the insufficiently dried image).

From the viewpoint of further improving the drying properties and the rub resistance of the image, the boiling point of the organic solvent (C) is preferably 200° C. or lower, more preferably 170° C. or lower, still more preferably 160° C. or lower, and even still more preferably 150° C. or lower.

The lower limit of the boiling point of the organic solvent (C) is not particularly limited.

As the lower limit of the boiling point of the organic solvent (C), for example, 100° C., 110° C., 120° C., or 130° C. is preferable.

$SP_C$ is not particularly limited as long as $SP_C$ satisfies Expression (C1) (that is, $|SP_C-SP_B|\leq 10.0$). That is, the organic solvent (C) can be appropriately selected in consideration of the SP value (that is, $SP_B$) of the main resin in the resin (B).

$SP_C$ is preferably in a range of 10.0 to 30.0.

In a case where $SP_C$ is 30 or less, the rub resistance of the image is further improved. $SP_C$ is more preferably 28.0 or less, still more preferably 26.0 or less, and even still more preferably 25.0 or less.

In a case where $SP_C$ is 10.0 or greater, the range of selection of the organic solvent (C) is widened. $SP_C$ is more preferably 15.0 or greater, still more preferably 17.5 or more, even still more preferably 20.0 or greater, and even still more preferably 23.0 or greater.

As described above, $|SP_C-SP_B|$ satisfies the expression of "$|SP_C-SP_B|\leq 10.0$" (that is, Expression (C1)). That is, $|SP_C-SP_B|$ is 10.0 or less. In this manner, the rub resistance of the image is improved.

From the viewpoint of further improving the rub resistance of the image, $|SP_C-SP_B|$ is preferably 7.0 or less, more preferably 6.0 or less, and still more preferably 5.0 or less.

The lower limit of $|SP_C-SP_B|$ is not particularly limited. That is, $|SP_C-SP_B|$ may be 0.

The organic solvent (C) is not particularly limited as long as the organic solvent (C) has a boiling point of 250° C. or lower, has a nitrogen atom, and satisfies Expression (C1).

The organic solvent (C) may depend on the SP value ($SP_B$) of the main resin in the resin (B), and specific examples thereof include dimethylaminoethanol (DMAE) (see the examples below for the boiling point and the SP value thereof), 2-amino-2-methyl-1-propanol (AMP) (see the examples below for the boiling point and the SP value thereof), 2-pyrrolidone (2P) (see the examples below for the boiling point and the SP value thereof), N-methyl-2-pyrrolidone (a boiling point of 202° C. and an SP value of 23.6 $MPa^{1/2}$), and N-ethyl-2-pyrrolidone (a boiling point of 218° C. and an SP value of 22.4 $MPa^{1/2}$).

It is preferable that the organic solvent (C) may further contain a hydroxyl group.

In a case where the organic solvent (C) contains a hydroxyl group, the removability of the ink from the nozzle surface is further improved. The reason why such an effect is exhibited is considered that the moisturizing effect of the organic solvent (C) is further enhanced.

Examples of the organic solvent (C) containing a hydroxyl group include dimethylaminoethanol (DMAE), and 2-amino-2-methyl-1-propanol (AMP).

As described above, the content mass ratio [the organic solvent (C)/the main resin in the resin (B)] in the ink according to the embodiment of the present embodiment is 0.01 or greater and less than 2.0.

In this manner, the rub resistance of the image is improved, and the removability of the ink from the nozzle surface is improved.

Specifically, since the content mass ratio [the organic solvent (C)/the main resin in the resin (B)] in the ink according to the embodiment of the present disclosure 0.01 or greater, the following effects from the organic solvent (C) are effectively exhibited. Therefore, the rub resistance of the image is improved, and the removability of the ink from the nozzle surface is improved.

The first effect due to the organic solvent (C) is an effect of improving the film-forming property of the ink, which is exhibited because the organic solvent (C) satisfies Expression (C1). Such an effect contributes to the improvement of the rub resistance of the image.

The second effect from the organic solvent (C) is a moisturizing effect which is exhibited because the organic solvent (C) has a nitrogen atom. Such an effect contributes to the improvement of the removability of the ink from the nozzle surface.

The third effect of the organic solvent (C) is an effect of improving the drying properties of the ink, which is exhibited because the organic solvent (C) has a boiling point of 250° C. or lower. Such an effect contributes to the improvement of the rub resistance of the image. That is, in a case where the drying properties of the ink are improved, degradation of the rub resistance of the image due to remaining of the organic solvent (C) in the image is suppressed.

From the viewpoint of further improving the rub resistance of the image and the removability of the ink from the nozzle surface, the content mass ratio [the organic solvent (C)/the main resin in the resin (B)] is preferably 0.02 or greater and more preferably 0.10 or greater.

Since the content mass ratio [the organic solvent (C)/the main resin in the resin (B)] in the ink according to the embodiment of the present disclosure is less than 2.0, the rub resistance of the image is improved, and the removability of the ink from the nozzle surface is improved.

Specifically, since the content mass ratio [the organic solvent (C)/the main resin in the resin (B)] is less than 2.0, degradation of the rub resistance of the image due to remaining of the organic solvent (C) in the image is suppressed, and degradation of the removability of the ink from the nozzle surface due to the excessive film-forming property of the ink is also suppressed.

From the viewpoint of further improving the rub resistance of the image and the removability of the ink from the nozzle surface, the content mass ratio [the organic solvent (C)/the main resin in the resin (B)] is preferably 1.9 or less (that is, in a range of 0.01 to 1.9), more preferably 1.5 or greater (that is, in a range of 0.01 to 1.5), and still more preferably 1.0 or less (that is, in a range of 0.01 to 1.0).

The content of the organic solvent (C) is preferably in a range of 0.01% by mass to 10% by mass with respect to the total amount of the ink.

In a case where the content of the organic solvent (C) with respect to the total amount of the ink is in the above-described range, the rub resistance of the image and the removability of the ink from the nozzle surface are further improved.

The content of the organic solvent (C) is more preferably in a range of 0.05% by mass to 7.0% by mass and more preferably in a range of 0.1% by mass to 5.0% by mass with respect to the total amount of the ink.

<Organic Solvent (D)>

It is preferable that the ink according to the embodiment of the present disclosure has no nitrogen atom and contains an organic solvent (D) satisfying Expression (D1).

$$|SP_D - SP_{CM}| \leq 5.0 \qquad \text{Expression (D1)}$$

In Expression (D1), $SP_{CM}$ represents an SP value of a main organic solvent in the organic solvent (C) in the unit of $MPa^{1/2}$, $SP_D$ represents an SP value of the organic solvent (D) in the unit of $MPa^{1/2}$, and $|SP_D - SP_{CM}|$ represents an absolute value of a difference between $SP_D$ and $SP_{CM}$.

Here, the "main organic solvent in the organic solvent (C)" indicates an organic solvent having the largest mass content with respect to the total amount of the ink in the entire organic solvent (C) contained in the ink.

The number of kinds of main organic solvents in the organic solvent (C) is not limited to one and may be two or more.

For example, in a case where the organic solvent (C) consists of an organic solvent X, an organic solvent Y, and an organic solvent Z, the content mass of the organic solvent X is the same as the content mass of the organic solvent Y, and each of the content mass of the organic solvent X and the content mass of the organic solvent Y is greater than the content mass of the organic solvent Z, the main organic solvents in the organic solvent (C) are two organic solvents, which are the organic solvent X and the organic solvent Y In a case where two or more main organic solvents are present in the organic solvent (C), the organic solvent (D) is an organic solvent which satisfies Expression (D1) with respect to all the main organic solvents and has no nitrogen atom.

Expression (D1) means that the compatibility between the main organic solvent in the organic solvent (C) and the organic solvent (D) is high.

In a case where the ink according to the embodiment of the present disclosure contains the organic solvent (D), the removability of the ink from the nozzle surface is further improved.

The reason for this is considered to be that rapid drying of the ink on the nozzle surface is suppressed and degradation of the removability due to the rapid drying is suppressed because of the main organic solvent in the organic solvent (C) and the organic solvent (D) which have high compatibility.

In a case where the ink according to the embodiment of the present disclosure contains the organic solvent (D), the number of kinds of the organic solvents (D) to be contained may be only one or two or more.

From the viewpoint of further improving the drying properties and the rub resistance of the image, the boiling point of the organic solvent (D) is preferably 250° C. or lower and more preferably 200° C. or lower.

The lower limit of the boiling point of the organic solvent (D) is not particularly limited.

As the lower limit of the boiling point of the organic solvent (D), for example, 100° C., 110° C., 120° C., or 130° C. is preferable.

From the viewpoint of further improving the removability of the ink from the nozzle surface, it is preferable that the organic solvent (D) contains at least one selected from the group consisting of a glycol compound, a glycol monoether compound, and a monoalcohol compound having 5 or more carbon atoms.

In this case, the total proportion of the glycol compound, the glycol monoether compound, and the monoalcohol compound having 5 or more carbon atoms in the organic solvent (D) is preferably in a range of 50% by mass to 100% by mass, more preferably in a range of 60% by mass to 100% by mass, and still more preferably in a range of 80% by mass to 100% by mass.

The glycol compound as the organic solvent (D) depends on the kind of the organic solvent (C), and examples thereof include dipropylene glycol (a boiling point of 232° C. and an SP value of 28.1 $MPa^{1/2}$), 1,2-hexanediol (a boiling point of 223° C. and an SP value of 27.1 $MPa^{1/2}$), 2-ethyl-1,3-hexanediol (a boiling point of 244° C. and an SP value of 25.9 $MPa^{1/2}$), and triethylene glycol (a boiling point of 285° C. and an SP value of 28.9 $MPa^{1/2}$).

The glycol monoether compound as the organic solvent (D) depends on the kind of the organic solvent (C), and examples thereof include diethylene glycol monobutyl ether (a boiling point of 230° C. and an SP value of 21.5 $MPa^{1/2}$), diethylene glycol monoethyl ether (a boiling point of 202° C. and an SP value of 22.8 $MPa^{1/2}$), dipropylene glycol monomethyl ether (a boiling point of 188° C. and an SP value of 22.1 $MPa^{1/2}$), ethylene glycol monobutyl ether (a boiling point of 171° C. and an SP value of 21.8 $MPa^{1/2}$), propylene glycol monobutyl ether (a boiling point of 170° C. and an SP value of 21.1 $MPa^{1/2}$), ethylene glycol monopropyl ether (a boiling point of 151° C. and an SP value of 22.6 $MPa^{1/2}$), propylene glycol monopropyl ether (a boiling point of 149° C. and an SP value of 21.7 $MPa^{1/2}$), propylene glycol monoethyl ether (a boiling point of 132° C. and an SP value of 22.5 $MPa^{1/2}$), propylene glycol monomethyl ether (a boiling point of 120° C. and an SP value of 23.6 $MPa^{1/2}$), and tripropylene glycol monomethyl ether (a boiling point of 243° C. and an SP value of 20.4 MPa$^{1/2}$).

The monoalcohol compound having 5 or more carbon atoms as the organic solvent (C) depends on the kind of the organic solvent (C), and examples thereof include 2-ethyl-1-hexanol (a boiling point of 187° C. and an SP value of 19.7 MPa$^{1/2}$), 1-octanol (a boiling point of 196° C. and an SP value of 19.8 MPa$^{1/2}$), 2-octanol (a boiling point of 179° C. and an SP value of 20.1 MPa$^{1/2}$), 2-propyl-1-hexanol (a boiling point of 193° C. and an SP value of 19.4 MPa$^{1/2}$), 1-pentanol (a boiling point of 137° C. and an SP value of 21.4 MPa$^{1/2}$), 1-hexanol (a boiling point of 157° C. and an SP value of 20.7 MPa$^{1/2}$), and 1-decanol (a boiling point of 230° C. and an SP value of 19.2 MPa$^{1/2}$).

The monoalcohol compound having 5 or more carbon atoms as the organic solvent (D) has preferably 5 to 10 carbon atoms, more preferably 6 to 10 carbon atoms, still more preferably 7 to 10 carbon atoms, and even still more preferably 8 or 9 carbon atoms.

From the viewpoint of further improving the removability of the ink from the nozzle surface, it is still more preferable that the organic solvent (D) contains at least one selected from the group consisting of a glycol monoether compound and a monoalcohol compound having 5 or more carbon atoms.

In this case, the total proportion of the glycol monoether compound and the monoalcohol compound having 5 or more carbon atoms in the organic solvent (D) is preferably in a range of 50% by mass to 100% by mass, more preferably in a range of 60% by mass to 100% by mass, and still more preferably in a range of 80% by mass to 100% by mass.

The total content of the organic solvent (D) is preferably in a range of 0.01% by mass to 5.0% by mass with respect to the total amount of the ink.

In a case where the total content of the organic solvent (D) is 0.01% by mass or greater, the removability of the ink from the nozzle surface is further improved. The total content of the organic solvent (D) is preferably 0.05% by mass or greater, more preferably 0.1% by mass or greater, and still more preferably 0.5% by mass or greater.

In a case where the total content of the organic solvent (D) is 5.0% by mass or less, the drying properties of the image and the rub resistance of the image are improved. The total content of the organic solvent (D) is preferably 4.0% by mass or less, more preferably 3.0% by mass or less, and still more preferably 2.0% by mass or less.

<Other Organic Solvents>

The ink according to the embodiment of the present disclosure may contain at least one organic solvent (hereinafter, also referred to as an organic solvent (E)) other than the organic solvent (C) and the organic solvent (D).

As the organic solvent (E), a water-soluble organic solvent is preferable.

In a case where the ink contains a water-soluble organic solvent as the organic solvent (E), the jettability of the ink from the ink jet head is further improved.

In the present disclosure, the term "water-soluble" indicates a property that 1 g or greater (preferably 3 g or greater or more preferably 10 g or greater) of a substance is dissolved in 100 g of water at 25° C.

From the viewpoint of further improving the drying properties of the ink, the boiling point of the organic solvent (E) is preferably 250° C. or lower.

The boiling point of the organic solvent (E) is preferably 200° C. or lower.

The lower limit of the boiling point of the organic solvent (E) is not particularly limited.

As the lower limit of the boiling point of the organic solvent (E), for example, 100° C., 110° C., 120° C., or 130° C. is preferable.

From the viewpoint of further improving the jettability of the ink, it is preferable that the organic solvent (E) satisfies Expression (E1).

$$|SP_E - SP_B| > 10.0 \qquad \text{Expression (E1)}$$

In Expression (E1), $SP_B$ represents an SP value of the main resin in the resin (B) in the unit of MPa$^{1/2}$, $SP_E$ represents an SP value of the organic solvent (E) in the unit of MPa$^{1/2}$, and $|SP_E - SP_B|$ represents an absolute value of a difference between $SP_E$ and $SP_B$.

As described above, $|SP_D - SP_B|$ satisfies Expression of "$|SP_E - SP_B| > 10.0$" (that is, Expression (E1)). That is, $|SP_E - SP_B|$ is greater than 10.0. In this manner, the jettability of the ink is further improved.

In $SP_E$ and $SP_B$, the value obtained by subtracting $SP_B$ from $SP_E$ (that is, $SP_E - SP_B$) is preferably greater than 10.0.

$SP_E$ is preferably 30.0 or greater.

In a case where $SP_E$ is 30.0 or greater, Expression (D1) is easily satisfied.

$SP_E$ is preferably 50.0 or less and more preferably 40.0 or less.

Further, from the viewpoint of further improving the jettability of the ink, it is preferable that the organic solvent (E) is at least one selected from the group consisting of a glycol compound.

Examples of the glycol compound as the organic solvent (E) include propylene glycol (a boiling point of 188° C. and an SP value of 35.1 MPa$^{1/2}$) and diethylene glycol (a boiling point of 245° C. and an SP value of 32.3 MPa$^{1/2}$).

Further, in a case where Expression (E1) is satisfied even with a compound exemplified as the glycol compound serving as the organic solvent (D) described above, the compound may also be used as the glycol compound serving as the organic solvent (E).

Further, in a case where the ink contains the organic solvent (E), the total content of the organic solvent (E) is preferably in a range of 5% by mass to 40% by mass with respect to the total amount of the ink.

In a case where the total content of the organic solvent (E) is 5% by mass or greater, the jettability of the ink is further improved. From the viewpoint of further improving the jettability of the ink, the total content of the organic solvent (E) is more preferably 10% by mass or greater, still more preferably 15% by mass or greater, and even still more preferably 20% by mass or greater.

In a case where the total content of the organic solvent (E) is 40% by mass or less, the drying properties of the image are further improved. From the viewpoint of further improving the drying properties of the image, the total content of the organic solvent (E) is more preferably 35% by mass or less and still more preferably 30% by mass or less.

<Colorant>

The ink according to the embodiment of the present disclosure may further contain a colorant.

Examples of the colorant include an organic pigment, an inorganic pigment, and a dye.

Examples of the organic pigment include an azo pigment, a polycyclic pigment, a chelate dye, a nitro pigment, a nitroso pigment, and aniline black.

Examples of the inorganic pigment include a white inorganic pigment, iron oxide, barium yellow, cadmium red, chrome yellow, and carbon black.

Preferred examples of the colorant include the colorants described in paragraphs 0096 to 0100 of JP2009-241586A.

It is preferable that the colorant contains a white inorganic pigment. The ink in this case can be suitably used as, for example, a white ink. Further, in a case where the ink contains, as the colorant, a white inorganic pigment and a pigment of a color other than white, the ink can also be used as an ink in which a chromatic tint is added to the white color.

Examples of the white inorganic pigment include titanium dioxide ($TiO_2$), barium sulfate, calcium carbonate, aluminum hydroxide, silica, zinc oxide, zinc sulfide, mica, talc, and pearl. Among the examples of the white inorganic pigment, titanium dioxide, barium sulfate, calcium carbonate, or zinc oxide is preferable, and titanium dioxide is more preferable.

The ink containing a white inorganic pigment is required to have a property of concealing a base (for example, an impermeable base material or a chromatic image recorded on an impermeable base material) (hereinafter, also referred to as "concealability") using an image formed of the ink (for example, a white image).

In some cases, a white inorganic pigment having a large particle diameter (for example, having an average primary particle diameter of 150 nm or greater) is selected as the white inorganic pigment in order to enhance the concealability, and the content of the white inorganic pigment in the ink is set to be large (for example, 3% by mass or greater).

In such a case, the resin (B) in the ink may be required to have a higher film-forming property in order for film formation using the ink for each pigment.

The ink according to the embodiment of the present disclosure also satisfies such a requirement.

The average primary particle diameter of the white inorganic pigment is, for example, in a range of 150 nm to 400 nm.

In a case where the average primary particle diameter thereof is 150 nm or greater, the concealability is further improved. Further, in a case where the average primary particle diameter thereof is 400 nm or less, the jettability of the ink is further improved.

The average primary particle diameter of the white inorganic pigment is preferably in a range of 250 nm to 350 nm and more preferably in a range of 250 nm to 300 nm.

The average primary particle diameter of the white inorganic pigment is a value measured using a transmission electron microscope (TEM). A transmission electron microscope 1200EX (manufactured by JEOL Ltd.) can be used for the measurement.

Specifically, the average primary particle diameter is defined as a value obtained by adding the ink diluted to 1000 times dropwise to Cu200 mesh (manufactured by JEOL Ltd.) to which a carbon film has been attached, drying the ink, measuring the equivalent circle diameters of 300 independent particles that do not overlap each other in the image enlarged at a magnification of 100000 times using a TEM, and simply averaging the measured values.

The content of the white inorganic pigment is preferably in a range of 1% by mass to 20% by mass, more preferably in a range of 3% by mass to 17% by mass, and still more preferably in a range of 5% by mass to 15% by mass with respect to the total amount of the ink.

In a case where the content of the white inorganic pigment is 1% by mass or greater, the concealability is further improved.

Further, in a case where the content of the white inorganic pigment is 20% by mass or less, the rub resistance of the image is further improved.

<Other Components>

The ink according to the embodiment of the present disclosure may contain components other than the components described above.

Examples of other components include a surfactant, a wax, a fading inhibitor, an emulsion stabilizer, a penetration enhancer, an ultraviolet absorbing agent, a preservative, an antibacterial agent, a pH adjuster (a neutralizer such as an organic base or inorganic alkali), an antifoaming agent, a viscosity adjuster, a dispersion stabilizer, a rust inhibitor, and a chelating agent.

<Preferable Physical Properties of Ink>

The viscosity of the ink according to the embodiment of the present disclosure is preferably in a range of 1.2 mPa·s to 15.0 mPa·s, more preferably 2 mPa·s or greater and less than 13 mPa·s, and still more preferably 2.5 mPa·s or greater and less than 10 mPa·s.

The viscosity is a value measured at 25° C. using a viscometer.

As the viscometer, for example, a VISCOMETER TV-22 type viscometer (manufactured by Toki Sangyo Co., Ltd.) can be used.

The surface tension of the ink according to the embodiment of the present disclosure is preferably in a range of 25 mN/m to 40 mN/m and more preferably in a range of 27 mN/m to 37 mN/m.

The surface tension is a value measured at a temperature of 25° C.

The surface tension can be measured using, for example, an Automatic Surface Tentiometer CBVP-Z (manufactured by Kyowa Interface Science Co., Ltd.).

From the viewpoint of the dispersion stability, the pH of the ink according to the embodiment of the present disclosure at 25° C. is preferably in a range of 6 to 11, more preferably in a range of 7 to 10, and still more preferably in a range of 7 to 9.

The pH of the ink at 25° C. is measured using a commercially available pH meter.

[Image Recording Method]

An image recording method according to the embodiment of the present disclosure, includes a step of allowing the ink according to the embodiment of the present embodiment to be jetted from an ink jet head to apply the ink onto an impermeable base material and record an image (hereinafter, also referred to as an "image recording step"), and a step of removing the ink attached to a surface (that is, a nozzle surface) of the ink jet head from which the ink is jetted (hereinafter, also referred to as an "ink removal step").

The image recording method according to the embodiment of the present disclosure may include other steps as necessary.

Further, in the image recording step, the ink according to the embodiment of the present disclosure is not limited to being directly applied to the surface of the impermeable base material. The inks according to the embodiment of the present disclosure may be applied, for example, onto another image recorded on the impermeable base material or onto another liquid (for example, a treatment liquid) applied onto the impermeable base material.

The image recording method according to the embodiment of the present disclosure is an image recording method carried out using the ink according to the embodiment of the present disclosure.

Therefore, according to the image recording method according to the embodiment of the present disclosure, both the rub resistance of the image to be recorded on the impermeable base material and the removability of the ink attached to the nozzle surface of the ink jet head are achieved.

<Impermeable Base Material>

In the image recording method according to the embodiment of the present disclosure, an impermeable base material is used.

The impermeable base material indicates a base material having a water absorption rate (% by mass, 24 hr.) of less than 0.2 according to ASTMD 570 of the ASTM test method.

The impermeable base material is not particularly limited, but a resin base material is preferable.

The resin base material is not particularly limited, and examples thereof include a thermoplastic resin base material.

Examples of the resin base material include a base material obtained by molding a thermoplastic resin in the form of a sheet or film.

As the resin base material, a base material containing polypropylene, polyethylene terephthalate, nylon, polyethylene, or polyimide is preferable.

The resin base material may be a transparent resin base material or a colored resin base material.

Here, the term "transparent" indicates that the transmittance of visible light having a wavelength of 400 nm to 700 nm is 80% or greater (preferably 90% or greater).

The shape of the resin base material is not particularly limited, but a sheet-shaped resin base material is preferable. From the viewpoint of the productivity of a recording medium, a sheet-shaped resin base material which is capable of forming a roll by being wound is more preferable.

The thickness of the resin base material is preferably in a range of 10 μm to 200 μm and more preferably in a range of 10 μm to 100 μm.

The resin base material may be subjected to a surface treatment from the viewpoint of improving the surface energy.

Examples of the surface treatment include a corona treatment, a plasma treatment, a flame treatment, a heat treatment, an abrasion treatment, and a light irradiation treatment (UV treatment), but the present invention is not limited thereto.

<Image Recording Step>

The image recording step is a step of recording an image by jetting and applying the inkjet ink composition according to the embodiment of the present disclosure onto an impermeable base material from an ink jet head.

As the method of jetting the ink from the ink jet head, for example, an electric charge control method of allowing an ink to be jetted using an electrostatic attraction force; a drop-on-demand method (pressure pulse method) using a vibration pressure of a piezoelectric element; an acoustic ink jet method of allowing an ink to be jetted using a radiation pressure by converting an electric signal into an acoustic beam and irradiating the ink with the acoustic beam; and a thermal ink jet (bubble jet (registered trademark)) method of heating an ink to form bubbles and utilizing the generated pressure can be used.

Further, as the method of jetting the ink from the ink jet head, for example, a method described in JP1979-059936A (JP-S54-059936A), in which an ink is jetted from a nozzle using an action force caused by a rapid change in volume of the ink after being subjected to an action of thermal energy can also be used.

Further, as the method of jetting the ink from the ink jet head, a method described in paragraphs 0093 to 0105 of JP2003-306623A can also be used.

Examples of the system of the ink jet head include a shuttle system of performing recording while scanning a short serial head in the width direction of an impermeable base material serving as a recording medium and a line system of using a line head in which recording elements are aligned in correspondence with the entire area of one side of an impermeable base material.

In the line system, image recording can be performed on the entire surface of the impermeable base material by scanning the impermeable base material in a direction intersecting the direction in which the recording elements are aligned. In the line system, a transport system such as a carriage that scans a short head in the shuttle system is not necessary. Further, in the line system, since movement of a carriage and complicated scanning control between the head and the impermeable base material are not necessary as compared with the shuttle system, only the impermeable base material moves. Therefore, according to the line system, image recording at a higher speed than that of the shuttle system can be realized.

It is preferable to apply the ink using an ink jet head having a resolution of 300 dpi or greater (more preferably 600 dpi and still more preferably 800 dpi). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pL (pico liter) to 10 pL and more preferably in a range of 1.5 pL to 6 pL.

Further, from the viewpoints of improving the image unevenness and improving connection of continuous gradations, it is also effective that the ink is jetted by combining different liquid droplet amounts.

In the image recording step, an image may be obtained by heating and drying the ink which has been applied onto the impermeable base material.

Examples of the means for heating and drying the ink include known heating means such as a heater, known air blowing means such as a dryer, and means for combining these.

Examples of the method for heating and drying the ink include a method of applying heat using a heater or the like from a side of the impermeable base material opposite to the surface onto which the ink has been applied; a method of applying warm air or hot air to the surface of the impermeable base material onto which the ink has been applied; a method of applying heat using an infrared heater from the surface of the impermeable base material onto which the ink has been applied or from a side of the impermeable base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

Further, the impermeable base material may be heated in advance before the application of the ink.

The heating temperature may be appropriately set, but the temperature of the impermeable base material is set to be preferably in a range of 20° C. to 50° C. and more preferably in a range of 25° C. to 40° C.

In the image recording step, an image may be formed by applying two or more kinds of inks corresponding to the ink according to the embodiment of the present disclosure. As the two or more kinds of inks in this case, for example, a first ink containing a white inorganic pigment and a second ink containing a colorant of a color other than white without containing a white inorganic pigment can be used. As a more specific embodiment of this case, first, an embodiment in which an image of characters, figures, and the like is recorded by the second ink on a transparent resin base material serving as an impermeable base material, and an image (for example, a solid image) is recorded by the first ink so as to cover the image recorded by the second ink and an image non-forming area of the impermeable base material is exemplified. In this case, the image of characters, figures, and the like recorded by the second ink is visually recognized through the impermeable base material from the side of the rear surface (that is, the side opposite to the side where the image is formed) of the impermeable base material.

Further, the image recording method according to the embodiment of the present disclosure may include the image recording step (hereinafter, also referred to as a "first image recording step") using the ink according to the embodiment of the present disclosure and a second image recording step using an ink that does not correspond to the ink according to the embodiment of the present disclosure.

As a specific embodiment in this case, an embodiment in which an ink A containing a white inorganic pigment is used as the ink according to the embodiment of the present disclosure and an ink B containing a colorant of a color other than white without containing a white inorganic pigment is used as the ink that does not correspond to the ink according to the embodiment of the present disclosure is exemplified. As a more specific embodiment in this case, first, an embodiment in which an image of characters, figures, and the like is recorded by the ink B on a transparent resin base material serving as an impermeable base material by performing the second image recording step, and an image (for example, a solid image) is recorded by the ink A so as to cover the image recorded by the second ink and the image non-forming area of the impermeable base material by performing the first image recording step is exemplified. In this case, the image of characters, figures, and the like recorded by the ink B is visually recognized through the impermeable base material from the side of the rear surface (that is, the surface on the side opposite to the surface on which the image is formed) of the impermeable base material.

It is preferable to use an aqueous ink as the ink B, similar to the ink A. Specific examples of the ink B include an ink which is the same as the ink according to the embodiment of the present disclosure except that the ink does not contain the white inorganic pigment and the organic solvent (C).

<Ink Removal Step>

The ink removal step is a step of removing the ink attached to the surface (that is, the nozzle surface of the ink jet head) of the ink jet head from which the ink is jetted.

Examples of the method of removing the ink from the nozzle surface of the ink jet head in the ink removal step include a method of removing the ink using a liquid, a method of removing the ink with cloth, paper, or a wiper blade, and a method of combining these methods.

Examples of the liquid for removing the ink from the nozzle surface include a liquid containing water, and more specific examples thereof include water, a water-soluble organic solvent, and a mixed solution containing water and a water-soluble organic solvent.

Examples of the mixed solution containing water and a water-soluble organic solvent include a maintenance liquid for an ink jet head which contains water, a water-soluble organic solvent, and a surfactant (for example, a maintenance liquid for ink jet recording described in JP5819206B).

In a case where the ink is removed from the nozzle surface using a liquid, it is preferable that the liquid is applied to the nozzle surface.

The amount of liquid to be applied to the nozzle surface is, for example, in a range of 1 $g/m^2$ to 100 $g/m^2$.

The liquid can be applied to the nozzle surface by, for example, performing jetting according to an ink jet method, coating using a roller, or spraying.

Further, as the method of applying the liquid to the nozzle surface, for example, methods carried out using a water head difference described in JP2011-073295A and JP2011-073339A may be employed.

Preferred examples of the removal method for removing the ink from the nozzle surface include a method of rubbing (wiping) the nozzle surface with a wiper blade to scrape off the ink; a method of eliminating the ink using a wind pressure or a liquid pressure; and a method of wiping the ink with cloth or paper. These methods may be carried out by applying a liquid to the nozzle surface.

Among these, a method of wiping the ink with cloth or paper is preferable.

As the method of wiping the ink with cloth or paper, for example, a method of reducing the replacement frequency of a wiping member and making a device compact, described in JP2010-241127A, may be employed.

As the material of the wiper blade, elastic rubber is preferable.

Specific examples of the material include butyl rubber, chloroprene rubber, ethylene propylene rubber, silicone rubber, urethane rubber, and nitrile rubber. From the viewpoint of ink repellency of the wiper blade, a wiper blade coated with a fluororesin or the like may be used.

<Step of Applying Treatment Liquid>

The image recording method according to the embodiment of the present disclosure may include a step of applying a treatment liquid, which contains an aggregating agent allowing components in the ink to be aggregated, onto the impermeable base material (hereinafter, also referred to as a "treatment liquid application step") before the image recording step described above.

In this case, in the image recording step, an image is recorded by applying the ink according to the embodiment of the present disclosure onto at least a part of the surface of the impermeable base material to which the treatment liquid has been applied.

In a case where the image recording method according to the embodiment of the present disclosure includes the first image recording step and the second image recording step described above and also includes the treatment liquid application step, it is preferable that the treatment liquid application step, the second image recording step, and the first image recording step are performed in order.

In a case where the image recording method according to the embodiment of the present disclosure includes the treatment liquid application step, the aggregating agent allows the components (for example, the resin (B)) in the ink to be aggregated on the impermeable base material. In this manner, high-speed image recording is realized. In this manner, the rub resistance of the image is further improved.

The application of the treatment liquid onto the impermeable base material can be performed by applying a known method such as a coating method, an ink jet method, or an immersion method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater. The details of the ink jet method are the same as the details of the ink jet method which can be applied to the image recording step described above.

Further, the impermeable base material may be heated before the application of the treatment liquid in the treatment liquid application step.

The heating temperature is set such that the temperature of the impermeable base material is preferably in a range of 20° C. to 50° C. and more preferably in a range of 25° C. to 40° C.

In the treatment liquid application step, the treatment liquid may be heated and dried after the application of the treatment liquid and before the image recording step described above.

Examples of the means for heating and drying the treatment liquid include known heating means such as a heater, known air blowing means such as a dryer, and means for combining these.

Examples of the method of heating and drying the treatment liquid include a method of applying heat from a side of the impermeable base material opposite to the surface to which the treatment liquid has been applied using a heater or the like, a method of applying warm air or hot air to the surface of the impermeable base material to which the treatment liquid has been applied, a method of applying heat from the surface of the impermeable base material to which the treatment liquid has been applied or from a side of the impermeable base material opposite to the surface to which the treatment liquid has been applied using an infrared heater, and a method of combining a plurality of these methods.

The heating temperature the treatment liquid in a case of heating and drying the treatment liquid is preferably 35° C. or higher and more preferably 40° C. or higher.

The upper limit of the heating temperature is not particularly limited, and the upper limit thereof is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

Hereinafter, the details of the treatment liquid used in the image recording method according to the embodiment of the present disclosure will be described.

(Treatment Liquid)

The treatment liquid contains an aggregating agent that allows the components in the ink to be aggregated.

It is preferable that the treatment liquid contains at least one selected from the group consisting of a polyvalent metal compound, an organic acid, a metal complex, and a water-soluble cationic polymer as the aggregating agent.

It is preferable that the aggregating agent contains an organic acid.

—Polyvalent Metal Compound—

Examples of the polyvalent metal compound include alkaline earth metals of a group 2 (such as magnesium and calcium) in the periodic table, transition metals of a group 3 (such as lanthanum) in the periodic table, cations of a group 13 (such as aluminum) in the periodic table, and salts of lanthanides (such as neodymium).

As salts of these metals, salts of organic acids, a nitrate, a chloride, and a thiocyanate described below are suitable.

Among these, a calcium salt or magnesium salt of an organic acid (such as formic acid, acetic acid, or a benzoate), a calcium salt or magnesium salt of nitric acid, calcium chloride, magnesium chloride, and a calcium salt or magnesium salt of thiocyanic acid are preferable.

Further, it is preferable that at least a part of the polyvalent metal compound is dissociated into polyvalent metal ions and counterions in the treatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the treatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, 4-methylphthalic acid, lactic acid, pyrrolidone carboxylic acid, pyrrone carboxylic acid, pyrrole carboxylic acid, furan carboxylic acid, pyridine carboxylic acid, coumarinic acid, thiophene carboxylic acid, and nicotinic acid. These compounds may be used alone or in combination of two or more kinds thereof.

From the viewpoint of the aggregation rate of the ink, as the organic compound containing a carboxy group, a di- or higher valent carboxylic acid (hereinafter, also referred to as polyvalent carboxylic acid) is preferable, and a dicarboxylic acid is more preferable.

As the dicarboxylic acid, malonic acid, malic acid, maleic acid, succinic acid, glutaric acid, fumaric acid, tartaric acid, 4-methylphthalic acid, or citric acid is preferable, and malonic acid, malic acid, tartaric acid, glutaric acid, or citric acid is more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Metal Complex—

As the metal complex, a metal complex including at least one selected from the group consisting of zirconium, aluminum, and titanium as a metal element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

—Water-Soluble Cationic Polymer—

Examples of the water-soluble cationic polymer include polyallylamine, polyallylamine derivatives, poly-2-hydroxypropyldimethylammonium chloride, and poly(diallyldimethylammonium chloride).

The water-soluble cationic polymer can refer to the descriptions in known documents such as JP2011-042150A (particularly, paragraph 0156) and JP2007-098610A (particularly, paragraphs 0096 to 0108) as appropriate.

Examples of commercially available products of the water-soluble cationic polymer include SHALLOL (registered trademark) DC-303P and SHALLOL DC-902P (both manufactured by DKS Co., Ltd.), CATIOMASTER (registered trademark) PD-7 and CATIOMASTER PD-30 (both manufactured by Yokkaichi Chemical Co., Ltd.) and UNISENCE FPA100L (manufactured by Senka Corporation).

The content of the aggregating agent is not particularly limited.

From the viewpoint of the aggregation rate of the ink, the content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the treatment liquid.

—Water—

It is preferable that the treatment liquid contains water.

The content of water is preferably in a range of 50% by mass to 90% by mass and more preferably in a range of 60% by mass to 80% by mass with respect to the total amount of the treatment liquid.

—Resin Particles—

The treatment liquid may contain resin particles. In a case where the treatment liquid contains resin particles, an image with excellent adhesiveness can be obtained.

As the resin particles, particles which are the same as the resin particles which may be contained in the ink described above can be used.

The content of resin particles is not particularly limited.

The content of the resin particles is preferably in a range of 0.5% by mass to 30% by mass, more preferably in a range of 1% by mass to 20% by mass, and particularly preferably in a range of 1% by mass to 15% by mass with respect to the total amount of the treatment liquid.

—Water-Soluble Solvent—

It is preferable that the treatment liquid contains at least one kind of water-soluble solvent.

As the water-soluble solvent, known solvents can be used without particular limitation.

Examples of the water-soluble solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among these, from the viewpoint of suppressing transfer of components, polyhydric alcohol or polyhydric alcohol ether is preferable, and alkanediol, polyalkylene glycol, or polyalkylene glycol ether is more preferable.

—Surfactant—

The treatment liquid may contain at least one kind of surfactant.

The surfactant can be used as a surface tension adjuster or an antifoaming agent. Examples of the surface tension adjuster or the antifoaming agent include a non-ionic surfactant, a cationic surfactant, an anionic surfactant, and a betaine surfactant. Among these, from the viewpoint of the aggregation rate of the ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989).

Further, other examples of the surfactant include fluorine-based (fluorinated alkyl-based) surfactants and silicone-based surfactants described in JP2003-322926A, JP2004-325707A, and JP2004-309806A.

For example, in a case where the treatment liquid contains a surfactant as an antifoaming agent, the content of the surfactant as an antifoaming agent is preferably in a range of 0.0001% by mass to 1% by mass and more preferably in a range of 0.001% by mass to 0.1% by mass with respect to the total amount of the treatment liquid.

—Other Components—

The treatment liquid may contain other components in addition to the above-described components as necessary.

Examples of other components that may be contained in the treatment liquid include known additives such as a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

(Physical Properties of Treatment Liquid)

From the viewpoint of the aggregation rate of the ink, the pH of the treatment liquid at 25° C. is preferably in a range of 0.1 to 3.5.

In a case where the pH of the treatment liquid is 0.1 or greater, the roughness of the impermeable base material is further reduced and the adhesiveness of the image area is further improved.

In a case where the pH of the treatment liquid is 3.5 or less, the aggregation rate is further improved, coalescence of dots (ink dots) caused by the ink on the surface of the impermeable base material is further suppressed, and the roughness of the image is further reduced.

The pH of the treatment liquid at 25° C. is more preferably in a range of 0.2 to 2.0. The conditions for measuring the pH of the treatment liquid at 25° C. are the same as the conditions for measuring the pH of the ink at 25° C. described above.

In the case where the treatment liquid contains an aggregating agent, from the viewpoint of the aggregation rate of the ink, the viscosity of the treatment liquid is preferably in a range of 0.5 mPa·s to 10 mPa·s and more preferably in a range of 1 mPa·s to 5 mPa·s. The conditions for measuring the viscosity of the treatment liquid here are the same as the conditions for measuring the viscosity of the ink described above.

The surface tension of the treatment liquid at 25° C. is preferably 60 mN/m or less, more preferably in a range of 20 mN/m to 50 mN/m, and still more preferably in a range of 30 mN/m to 45 mN/m. The conditions for measuring the surface tension of the treatment liquid here are the same as the conditions for measuring the surface tension of the ink described above.

EXAMPLES

Hereinafter, examples of the present disclosure will be described below, but the present disclosure is not limited to the following examples.

In the description below, "water" indicates ion exchange water unless otherwise specified.

<Preparation of Aqueous Dispersion Liquid of Resin Particles or Aqueous Solution of Resin>

As described below, an aqueous dispersion liquid of acryl 1, an aqueous solution of acryl 2, an aqueous dispersion liquid of olefin 1, an aqueous dispersion liquid of acryl A, an aqueous dispersion liquid of urethane 1, and an aqueous dispersion liquid of polyester 1 were respectively prepared as aqueous dispersion liquids of resin particles.

Here, the resins in each dispersion liquid are resin particles, and the resin particles (that is, the acryl 1, the olefin 1, the acryl A, the urethane 1, and the polyester 1) are resin particles formed of the main resins in the resin (B). The acryl 2 in the aqueous solution is the main resin in the resin (B).

The SP values ($SP_B$) of the main resins in the resin (B) are as listed in Tables 1 and 2.

(Preparation of Aqueous Dispersion Liquid of Acryl 1)

The aqueous dispersion liquid of the acryl 1 was prepared as follows.

A 2 L three-neck flask (reaction container) provided with a stirrer, a thermometer, a reflux cooling pipe, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was lowered to 65° C., 163.0 g of isopropanol was added thereto, and the solution was allowed to be naturally cooled, thereby obtaining a polymerization solution containing a copolymer (concentration of solid contents of 41.0% by mass).

Next, 317.3 g of the obtained polymerization solution was weighed, 46.4 g of isopropanol, 1.65 g of a 20% maleic acid anhydride aqueous solution (water-soluble acidic compound, corresponding to 0.3% by mass as maleic acid with respect to the copolymer), and 40.77 g of a 2 mol/L sodium hydroxide (NaOH) aqueous solution were added to the solution, and the temperature of the liquid in the reaction container was increased to 70° C.

Next, 380 g of distilled water was added dropwise to the liquid which had been heated to 70° C., at a speed of 10 mL/min, to carry out dispersion in water (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 mass ppm as benzisothiazolin-3-one as the solid content of the polymer) of PROXEL GXL (S) (manufactured by Arch Chemicals, Inc.) was added to the obtained liquid.

The obtained liquid was filtered through a filter with a pore size of 1 μm, and the filtrate was collected, thereby obtaining an aqueous dispersion liquid of the acryl 1 (non-volatile content concentration of 23.2% by mass) as resin particles formed of a copolymer of methyl methacrylate, isobornyl methacrylate, methacrylic acid, and sodium methacrylate at a mass ratio of 70/20/5/5. The volume average particle diameter of the acryl 1 was 5.0 nm, and the weight-average molecular weight ($M_w$) of the acryl 1 was 60000.

(Preparation of Aqueous Solution of Acryl 2)

As an aqueous solution of the acryl 2 which is an acrylic resin, "ARON A-20L", (manufactured by Toagosei Co., Ltd., $M_w$=500000) was prepared.

(Preparation of Aqueous Dispersion Liquid of Olefin 1)

The aqueous dispersion liquid of the olefin 1 was prepared as follows.

100 kg of a propylene-butene-ethylene terpolymer (propylene/butene/ethylene=64.8/23.9/11.3% by mass) and 500 kg of toluene were put into a 2000 L sealable reaction container, and heated and melted in a nitrogen atmosphere. Thereafter, the temperature in the system was maintained at 110° C., and a solution of 1 kg of dicumyl peroxide as a radical generator in 20 kg of heptane was added thereto for 1 hour while the solution was stirred. Thereafter, a solution of 7 kg of maleic acid anhydride as an unsaturated carboxylic acid in 10 kg of heptane was added dropwise thereto for 1 hour, and then the solution was allowed to react for 30 minutes.

After the completion of the reaction, the solution was cooled to room temperature, the obtained reactant was put into a large amount of acetone so that the resin was precipitated. The resin was further washed with acetone several times to remove an unreacted substance and then dried under reduced pressure in a decompression dryer, thereby obtaining an acid-modified polyolefin resin.

The reaction container was charged with 60 kg of the acid-modified polyolefin resin, 70 kg of tetrahydrofuran (boiling point of 66° C.), 7 kg of N,N-dimethylethanolamine (boiling point of 134° C.), and 103 kg of distilled water using a stirrer equipped with a 1000 pressure-resistant reaction container which was heatable and sealable. The heater was turned on and heated while the solution was heated. Next, the temperature in the system was maintained at 140° C., and the solution was further stirred for 2 hours. Thereafter, the solution was water-cooled to 40° C. while being stirred.

100 kg of distilled water and 0.05 part by mass (30 g) of an emulsion type antifoaming agent 1 (NOPCO KF-99, manufactured by San Nopco Ltd.) with respect to 100 parts by mass of the resin were added to the obtained aqueous dispersion.

100 kg of an aqueous medium containing tetrahydrofuran was distilled off under reduced pressure (absolute pressure of 100 kPa) while the solution was heated and foaming was observed. It took 1 hour to distill off 100 kg of the aqueous medium.

Thereafter, the resulting solution was water-cooled until the internal temperature reached about 25° C. and filtered through a polypropylene wind cartridge filter (manufactured by Advantec Co., Ltd.) having a pore size of 25 μm, thereby obtaining an aqueous dispersion liquid of the olefin 1 as a polyolefin resin.

(Preparation of Aqueous Dispersion Liquid of Acryl A)

The aqueous dispersion liquid of the acryl 1 was prepared as follows.

A 2 L three-neck flask (reaction container) provided with a stirrer, a thermometer, a reflux cooling pipe, and a nitrogen gas introduction pipe was charged with 580.2 g of methyl ethyl ketone, and the solution was heated to 90° C. Next, a mixed solution formed of 312.5 g of methyl methacrylate, 220.3 g of 2-ethylhexyl methacrylate, 135 g of methyl ethyl ketone, and 2.32 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.23 g of "V-601" and 7.1 g of methyl ethyl ketone was added to the solution, and the resulting solution was stirred for 2 hours.

Next, the operation of the step (1) was repeatedly performed four times, a solution formed of 1.23 g of "V-601" and 7.1 g of methyl ethyl ketone was added to the solution, and the resulting solution was stirred for 3 hours (the operation carried out so far is referred to as the "reaction").

After completion of the reaction, the temperature of the solution was lowered to 65° C., 173.4 g of isopropanol was added thereto, and the solution was allowed to be naturally cooled, thereby obtaining a polymerization solution containing a copolymer.

Next, the polymerization solution was heated to 70° C., 349 g of distilled water was added dropwise to the polymerization solution, which had been heated to 70° C., at a speed of 10 mL/min, to carry out dispersion in water (dispersion step).

Thereafter, the isopropanol, the methyl ethyl ketone, and the distilled water in a total amount of 259.2 g were distilled off by maintaining the temperature of the liquid in the reaction container at 70° C. for 1.2 hours under reduced pressure (solvent removal step). 0.259 g (440 ppm as benzisothiazolin-3-one with respect to the solid content of the polymer) of PROXEL GXL (S) (manufactured by Arch Chemicals, Inc.) was added to the obtained liquid.

The obtained liquid was filtered through a filter with a pore size of 1 μm, and the filtrate was collected, thereby obtaining an aqueous dispersion liquid of the acryl A (nonvolatile content concentration of 27.9% by mass) as a copolymer of methyl methacrylate and 2-ethyl methacrylate at a mass ratio of 80/20. The volume average particle diameter of the acryl A was 110 nm, and the weight-average molecular weight ($M_w$) of the acryl A was 199900.

(Preparation of Aqueous Dispersion Liquid of Urethane 1)

As the aqueous dispersion liquid of the urethane 1, a urethane emulsion "WBR-2101" (nonvolatile content concentration of 27% by mass) (manufactured by Taisei Fine Chemical Co., Ltd.) was prepared.

(Preparation of Aqueous Dispersion Liquid of Polyester 1)

As the aqueous dispersion liquid of the polyester 1, a polyester emulsion "WR-961" (nonvolatile content concentration of 30% by mass) (manufactured by Nippon Synthetic Chemical Industry Co., Ltd.) was prepared.

<Preparation of Titanium Dioxide ($TiO_2$) Aqueous Dispersion Liquid>

(Synthesis of Pigment Dispersion Resin P-1)

In the following manner, a pigment dispersion resin P-1 for dispersing titanium dioxide ($TiO_2$) in water was synthesized.

Here, the pigment dispersion resin P-1 is a resin other than the main resin in the resin (B).

The same mass of dipropylene glycol as the total amount of monomers described below was added to a three-neck flask equipped with a stirrer and a cooling pipe and heated to 85° C. in a nitrogen atmosphere.

A solution I obtained by mixing 9.1 molar equivalents of stearyl methacrylate, 34.0 molar equivalents of benzyl methacrylate, 31.9 molar equivalents of hydroxyethyl methacrylate, 25.0 molar equivalents of methacrylic acid, and 0.8 molar equivalents of 2-mercaptopropionic acid and a solution II obtained by dissolving 1% by mass of t-butylperoxy-2-ethylhexanoate (Perbutyl 0, manufactured by NOF Corporation) with respect to the total amount of the monomers in 20% by mass of dipropylene glycol with respect to the total amount of the monomers were respectively prepared. The solution I was added dropwise to the three-neck flask for 4 hours, and the solution II was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance ($^1$H-NMR) method.

The obtained reaction solution was heated to 70° C., 20.0 molar equivalents of dimethylethanolamine was added thereto as an amine compound, propylene glycol was added thereto, and the resulting solution was stirred, thereby obtaining a 30 mass % solution of the pigment dispersion resin P-1.

The constituent components of the obtained polymer were confirmed by $^1$H-NMR. Further, the weight-average molecular weight ($M_w$) determined by GPC was 22000.

Further, the mass ratio of respective constitutional units in the pigment dispersion resin P-1 (constitutional unit derived from stearyl methacrylate/constitutional unit derived from benzyl methacrylate/constitutional unit derived from hydroxyethyl methacrylate/constitutional unit derived from methacrylic acid) was 20/39/27/14. Here, the mass ratio is a value that does not include the mass of dimethylaminoethanol.

Further, the numerical value on the lower right side of the parentheses of each of the following constitutional units is the molar ratio.

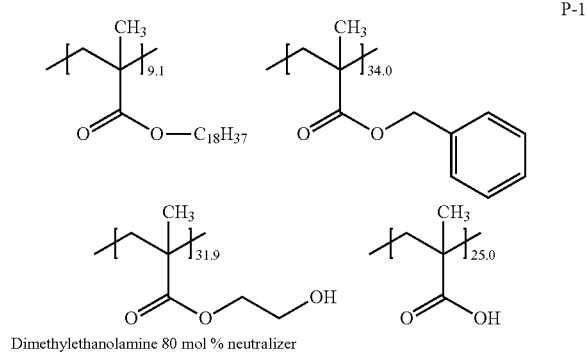

Dimethylethanolamine 80 mol % neutralizer (Preparation of Titanium Dioxide (TiO$_2$) Aqueous Dispersion Liquid)

A TiO$_2$ dispersion liquid was prepared in the following manner using a Lady Mill model LSG-4U-08 (manufactured by AIMEX Co., Ltd.).

That is, 45 parts by mass of titanium dioxide (TiO$_2$; average primary particle diameter: 210 nm, trade name: PF-690, manufactured by Ishihara Sangyo Kaisha, Ltd.; white inorganic pigment), 15 parts by mass of a 30 mass % solution of the pigment dispersion resin P-1, and 40 parts by mass of ultrapure water were added to a zirconia container. Further, 40 parts by mass of 0.5 mmφ zirconia beads (Torayceram beads, manufactured by Toray Industries, Inc.) were added thereto and mixed gently using a spatula. The zirconia container having the obtained mixture was put into a ball mill and dispersed at a rotation speed of 1000 rpm (revolutions per minute) for 5 hours. After the dispersion was completed, the beads were removed by filtration with a filter cloth, thereby preparing a TiO$_2$ dispersion liquid having a TiO$_2$ concentration of 45% by mass.

Example 1

<Preparation of Ink>

An ink having the following composition was prepared using the aqueous dispersion liquid of the acryl 1, the titanium dioxide (TiO$_2$) aqueous dispersion liquid, dimethylaminoethanol (DMAE) as the organic solvent (C), dipropylene glycol monomethyl ether (DPGmME) as the organic solvent (D), propylene glycol (a boiling point of 188° C. and an SP value of 35.1 MPa$^{1/2}$) as the organic solvent (E), and water.

The prepared ink is a white ink containing titanium dioxide (TiO$_2$) which is a white inorganic pigment as a colorant.

—Ink Composition—

Acryl 1 [resin particles formed of main resin in resin (B)] . . . 6.0% by mass

Dimethylaminoethanol (DMAE) [organic solvent (C)] . . . 1.0% by mass

DPGmME [organic solvent (D)] . . . 1.0% by mass

Propylene glycol (PG) [organic solvent (E)] . . . 27% by mass

Titanium dioxide (TiO$_2$) [colorant] . . . 7.0% by mass

Pigment dispersion resin P-1 [resin other than main resin in resin (B)] . . . 0.5% by mass Water . . . remaining amount set such that total amount of composition was 100% by mass <Image Recording>

Image recording was performed in the following manner using the ink and a biaxially oriented polypropylene (OPP) film as an impermeable base material (thickness of 40 μm, surface treatment: corona discharge treatment, manufactured by Futamura Chemical Co., Ltd.).

(1) Recording Method

A solid image which was a white image was recorded by applying the ink onto the surface of the impermeable base material, on which a corona discharge treatment had been performed, in the form of a solid image using an ink jet recording device equipped with a transport system for transporting a base material and an ink jet head and drying the applied ink at 80° C. for 30 seconds. The ink was dried by placing the impermeable base material, to which the ink had been applied, on a hot plate.

(2) Recording Conditions

Ink jet head: 1200 dpi/20 inch-width piezo full line head

Ink jet amount: 4.0 pL

Driving frequency: 30 kHz (transport speed of base material: 635 mm/sec)

<Evaluation>

The following evaluations were performed on the inks or images.

The results are listed in Table 1.

(Rub Resistance of Image)

The solid image after 5 minutes from the recording of the solid image (that is, drying of the image at 80° C. for 30 seconds) was repeatedly rubbed with a paperweight wound with rubbing paper. As the rubbing paper, OK Top Coat 104 (manufactured by Oji Paper Co., Ltd.) was used. Further, the rubbing operation described above was performed in a state where a load of 4.0 N was applied.

The color transfer from the solid image to the rubbing paper was visually observed, and the rub resistance of the image was evaluated based on the following evaluation standards.

In the following evaluation standards, the rank of the most excellent rub resistance of the image is "A".

—Evaluation Standards for Rub Resistance of Image—

A: Color transfer from the solid image to the rubbing paper was not visually recognized at the time of completion of the rubbing operation performed 200 times.

B: Color transfer from the solid image to the rubbing paper was visually recognized at the time of completion of the rubbing operation performed 200 times, but color transfer from the solid image to the rubbing paper was not visually recognized at the time of completion of the rubbing operation performed 100 times.

C: Color transfer from the solid image to the rubbing paper was visually recognized at the time of completion of the rubbing operation performed 100 times, but color transfer from the solid image to the rubbing paper was not visually recognized at the time of completion of the rubbing operation performed 20 times.

D: Color transfer from the solid image to the rubbing paper was visually recognized at the time of completion of the rubbing operation performed 20 times, but color transfer from the solid image to the rubbing paper was not visually recognized at the time of completion of the rubbing operation performed 5 times.

E: Color transfer from the solid image to the rubbing paper was not visually recognized at the time of completion of the rubbing operation performed 5 times.

(Removability of Ink from Nozzle Surface of Ink Jet Head)

The removability of the ink from the nozzle surface of the ink jet head (hereinafter, also simply referred to as "ink removability") was evaluated in the following manner.

First, as a silicon plate imitating the nozzle surface of an ink jet head, a silicon plate obtained by cutting a silicon wafer (silicon wafer "4-P-1", manufactured by AS ONE Corporation) into a size of 5 cm$^2$ was prepared.

Next, 10 µL of the ink was added dropwise onto the silicon plate, the silicon plate onto which the ink had been added dropwise was stored in a constant temperature chamber at a temperature of 40° C. for 1 hour and taken out from the constant temperature chamber after the storage.

Next, an operation of wiping the ink on the silicon plate (hereinafter, referred to as a "wiping operation") was repeatedly performed in a state of applying a load of 4 N thereto using cotton woven cloth (TEXWIPE TX304, manufactured by Texwipe) impregnated with 1 mL of a maintenance liquid having the following composition.

While the wiping operation was repeatedly performed, the ink removal state on the silicon plate was visually observed, and the ink removability was evaluated based on the following evaluation standards.

In the following evaluation standards, the rank of the most excellent ink removability is "A".

—Composition of Maintenance Liquid—
  DEGmBE (water-soluble organic solvent) . . . 20.0% by mass
  DEG (moisturizer) . . . 10.0% by mass
  Imidazole (pKa=7.0, basic compound) . . . 0.5% by mass
  Benzotriazole . . . 0.2% by mass
  Surfactant ($C_8H_{17}O$—$(CH_2CH_2O)_2$—H . . . 3.0 parts by mass
  Water: remaining amount set such that total amount of composition was 100% by mass —Evaluation Standards for Ink Removability—

A: All the ink on the plate was removed during which the wiping operation was performed 3 times.

B: All the ink on the plate was removed during which the wiping operation was performed 4 times or more and less than 6 times.

C: All the ink on the plate was removed during which the wiping operation was performed 7 times or more and less than 9 times.

D: All the ink on the plate was removed during which the wiping operation was performed 10 times or more and less than 12 times.

E: The ink on the plate partly remained even after the wiping operation was performed 13 times or more.

(Drying Properties of Image)

The logarithmic decrement (%) of the solid image after 5 minutes from the recording of the solid image (that is, drying of the image at 80° C. for 30 seconds) was measured at the time at which the temperature of the solid image (hereinafter, also referred to as the "sample temperature") was increased to 150° C. from room temperature at a temperature increase rate of 6.0° C./min using a pendulum viscoelasticity tester (rigid pendulum type physical property tester "RPT-3000W", manufactured by A&D Co., Ltd.). Based on the obtained results, the drying properties of the image were evaluated based on the following evaluation standards.

In the evaluation standards, the rank of the most excellent drying properties of the image is "A".

—Evaluation Standards for Drying Properties of Image—

A: The logarithmic decrement at a sample temperature of 80° C. was less than 4%.

B: The logarithmic decrement at a sample temperature of 80° C. was 4% or greater and less than 6%.

C: The logarithmic decrement at a sample temperature of 80° C. was 6% or greater and less than 10%.

D: The logarithmic decrement at a sample temperature of 80° C. was 10% or greater and less than 15%.

E: The logarithmic decrement at a sample temperature of 80° C. was 15% or greater.

Examples 2 to 11

The same operation as in Example 1 was performed except that a combination of the kind of the main resin in the resin (B), the amount of the main resin in the resin (B), the kind of the organic solvent (C), and the amount of the organic solvent (C) in the ink was changed as listed in Table 1.

The results are listed in Table 1.

Examples 12 and 13

The same operation as in Example 1 was performed except that the kind of the organic solvent (D) in the ink was changed as listed in Table 1.

The results are listed in Table 1.

Example 14

The same operation as in Example 1 was performed except that the organic solvent (D) was not contained in the ink.

The results are listed in Table 1.

Examples 15 to 17

The same operation as in Example 1 was performed except that the kind of the resin (B) in the ink was changed as listed in Table 1.

The results are listed in Table 1.

Comparative Examples 1 to 5

The same operation as in Example 1 was performed except that a combination of the kind of the main resin in the resin (B), the amount of the main resin in the resin (B), the kind of the organic solvent (C), the amount of the organic solvent (C), the kind of the organic solvent (D), and the amount of the organic solvent (D) in the ink was changed as listed in Table 2.

The results are listed in Table 2.

TABLE 1

| | Ink | | | | | | | |
|---|---|---|---|---|---|---|---|---|
| | Main resin in resin (B) | | | Organic solvent (C) | | | | |
| | Type | | SP value ($SP_B$) | Type | | SP value ($SP_C = SP_{CM}$) | $|SP_C - SP_B|$ | Boiling point (° C.) |
| | Particle | Non-particle | | Amount | Nitrogen-containing solvent | Nitrogen-free solvent | | | |
| Example 1 | Acryl 1 | — | 19.7 | 6.0% | DMAE | — | 23.7 | 4.0 | 133 |
| Example 2 | Acryl 1 | — | 19.7 | 6.0% | DMAE | — | 23.7 | 4.0 | 133 |
| Example 3 | Acryl 1 | — | 19.7 | 6.0% | DMAE | — | 23.7 | 4.0 | 133 |
| Example 4 | Acryl 1 | — | 19.7 | 0.8% | DMAE | — | 23.7 | 4.0 | 133 |
| Example 5 | Acryl 1 | — | 19.7 | 3.7% | DMAE | — | 23.7 | 4.0 | 133 |
| Example 6 | Acryl 1 | — | 19.7 | 2.0% | DMAE | — | 23.7 | 4.0 | 133 |
| Example 7 | Acryl 1 | — | 19.7 | 6.0% | DMAE | — | 23.7 | 4.0 | 133 |
| Example 8 | Acryl 1 | — | 19.7 | 6.0% | DMAE | — | 23.7 | 4.0 | 133 |
| Example 9 | Acryl 1 | — | 19.7 | 6.0% | AMP | — | 25.1 | 5.4 | 165 |
| Example 10 | — | Acryl 2 | 20.2 | 6.0% | DMAE | — | 23.7 | 3.5 | 133 |
| Example 11 | Acryl 1 | — | 19.7 | 6.0% | 2P | — | 25.9 | 6.2 | 245 |
| Example 12 | Acryl 1 | — | 19.7 | 6.0% | DMAE | — | 23.7 | 4.0 | 133 |
| Example 13 | Acryl 1 | — | 19.7 | 6.0% | DMAE | — | 23.7 | 4.0 | 133 |
| Example 14 | Acryl 1 | — | 19.7 | 6.0% | DMAE | — | 23.7 | 4.0 | 133 |
| Example 15 | Olefin 1 | — | 24.3 | 6.0% | DMAE | — | 23.7 | 0.6 | 133 |
| Example 16 | Urethane 1 | — | 19.1 | 6.0% | DMAE | — | 23.7 | 4.6 | 133 |
| Example 18 | Polyester 1 | — | 18.3 | 6.0% | DMAE | — | 23.7 | 5.4 | 133 |

| | Ink | | | | | | Evaluation result | | |
|---|---|---|---|---|---|---|---|---|---|
| | Organic solvent (C) | | Organic solvent (D) | | | | | | |
| | Amount | Content mass ratio [(C)/main resin in (B)] | Type | SP value ($SP_D$) | Amount | $|SP_D - SP_{CM}|$ | Rub resistance | Ink removability | Drying properties |
| Example 1 | 1.0% | 0.17 | DPGmME | 22.1 | 1.0% | 1.6 | A | A | A |
| Example 2 | 5.0% | 0.83 | DPGmME | 22.1 | 1.0% | 1.6 | A | A | A |
| Example 3 | 7.0% | 1.17 | DPGmME | 22.1 | 1.0% | 1.6 | B | B | A |
| Example 4 | 1.0% | 1.25 | DPGmME | 22.1 | 1.0% | 1.6 | C | B | A |
| Example 5 | 7.0% | 1.89 | DPGmME | 22.1 | 1.0% | 1.6 | C | C | A |
| Example 6 | 3.8% | 1.90 | DPGmME | 22.1 | 1.0% | 1.6 | C | C | A |
| Example 7 | 0.1% | 0.02 | DPGmME | 22.1 | 1.0% | 1.6 | B | B | A |
| Example 8 | 0.06% | 0.01 | DPGmME | 22.1 | 1.0% | 1.6 | C | C | A |
| Example 9 | 1.0% | 0.17 | DPGmME | 22.1 | 1.0% | 3.0 | B | A | A |
| Example 10 | 1.0% | 0.17 | DPGmME | 22.1 | 1.0% | 1.6 | A | B | A |
| Example 11 | 1.0% | 0.17 | DPGmME | 22.1 | 1.0% | 3.8 | C | A | C |
| Example 12 | 1.0% | 0.17 | TEG | 28.9 | 1.0% | 5.2 | C | B | C |
| Example 13 | 1.0% | 0.17 | EGmBE | 21.8 | 1.0% | 1.9 | A | A | A |
| Example 14 | 1.0% | 0.17 | — | — | — | — | A | C | A |
| Example 15 | 1.0% | 0.17 | DPGmME | 22.1 | 1.0% | 1.6 | A | A | A |
| Example 16 | 1.0% | 0.17 | DPGmME | 22.1 | 1.0% | 1.6 | A | A | A |
| Example 18 | 1.0% | 0.17 | DPGmME | 22.1 | 1.0% | 1.6 | B | A | A |

TABLE 2

| | Ink | | | | | | | |
|---|---|---|---|---|---|---|---|---|
| | Main resin in resin (B) | | | Organic solvent (C) | | | | |
| | Type | | SP value ($SP_B$) | Type | | SP value ($SP_C = SP_{CM}$) | $|SP_C - SP_B|$ | Boiling point (° C.) |
| | Particle | Non-particle | | Amount | Nitrogen-containing solvent | Nitrogen-free solvent | | | |
| Comparative Example 1 | Acryl 1 | — | 19.7 | 3.0% | DMAE | — | 23.7 | 4.0 | 133 |
| Comparative Example 2 | Acryl A | — | 15.4 | 6.0% | 2P | — | 25.9 | 10.5 | 245 |

TABLE 2-continued

| | | | | | | | | | |
|---|---|---|---|---|---|---|---|---|---|
| Comparative Example 3 | Olefin 1 | — | 24.3 | 6.0% | — | DEGmBE | 21.5 | 2.8 | 230 |
| Comparative Example 4 | Acryl 1 | — | 19.7 | 6.0% | DMAE | — | 23.7 | 4.0 | 133 |
| Comparative Example 5 | Acryl 1 | — | 19.7 | 6.0% | TEA | — | 34.7 | 15.0 | 335 |

| | Ink | | | | | | | |
|---|---|---|---|---|---|---|---|---|
| | Organic solvent (C) | | Organic solvent (D) | | | Evaluation result | | |
| | Amount | Content mass ratio [(C)/main resin in (B)] | Type | SP value ($SP_D$) | Amount | $|SP_D - SP_{CM}|$ | Rub resistance | Ink removability | Drying properties |
| Comparative Example 1 | 8.0% | 2.7 | DPGmME | 22.1 | 1.0% | 1.6 | D | D | A |
| Comparative Example 2 | 1.0% | 0.17 | DPGmME | 22.1 | 1.0% | 3.8 | E | B | C |
| Comparative Example 3 | 1.0% | 0.17 | DPGmME | 22.1 | 1.0% | 0.6 | A | D | B |
| Comparative Example 4 | 0.01% | 0.002 | DPGmME | 22.1 | 1.0% | 1.6 | D | D | A |
| Comparative Example 5 | 1.0% | 0.167 | TEG | 28.9 | 1.0% | 5.8 | E | A | E |

—Explanation of Table 1 and Table 2—

The "amount" in each component indicates the content (% by mass) with respect to the total amount of the ink.

In particular, the "amount" in the resin indicates the solid content of the resin (that is, the content of the resin) (% by mass) with respect to the total amount of the ink.

The content mass ratio [(C)/main resin in (B)] indicates the content mass ratio [the organic solvent (C)/the main resin in the resin (B)].

The unit of the SP value is $MPa^{1/2}$.

The nitrogen-containing solvent indicates an organic solvent having a nitrogen atom, and the nitrogen-free solvent indicates an organic solvent having no nitrogen atom.

Since water, the colorant, and the organic solvent (E) in the ink are components common to all the examples, the notation is provided in Tables 1 and 2.

—Abbreviations for Organic Solvents in Tables 1 and 2—

DMAE: dimethylaminoethanol
AMP: 2-amino-2-methyl-1-propanol
2P: 2-pyrrolidone
DEGmBE: diethylene glycol monobutyl ether
DPGmME: dipropylene glycol monomethyl ether
EGmBE: ethylene glycol monobutyl ether
TEA: triethanolamine
TEG: triethylene glycol As listed in Table 1, in each example in which the ink containing the water (A); the resin (B); and the organic solvent (C) that had a boiling point of 250° C. or lower, had a nitrogen atom, and satisfied Expression (C1) (that is, "$|SP_C - SP_B| \leq 10.0$") and having a content mass ratio [the organic solvent (C)/the main resin in the resin (B)] of 0.01 or greater and less than 2.0 was used, both the rub resistance and the ink removability of the image were achieved.

The results of the comparative examples with respect to each example were as follows (see Table 2).

In Comparative Example 1 in which the content mass ratio [the organic solvent (C)/the main resin in the resin (B)] in the ink was 2.0 or greater, the rub resistance and the ink removability of the image were degraded. The reason why the rub resistance of the image was degraded was considered that since the amount of the organic solvent (C) was extremely large, the organic solvent (C) remained in the image, and thus the image was sticky. The reason why the ink removability was degraded was considered that since the amount of the organic solvent (C) was excessive, the film-forming property of the ink on the silicon plate surface (nozzle surface) was excessive, the ink was attached to the silicon plate surface (that is, a hard film derived from the ink was formed), and thus the ink was unlikely to be removed.

In Comparative Example 2 in which $|SP_C - SP_B|$ in the ink was greater than 10.0, the ink removability was satisfactory, but the rub resistance of the image was degraded. The reason for this was considered to be that since $|SP_C - SP_B|$ was greater than 10.0, the film-forming property of the ink on the impermeable base material was insufficient, and thus the image intensity was insufficient.

In Comparative Example 3 in which the ink containing a comparative organic solvent (DEGmBE) having no nitrogen atom was used in place of the organic solvent (C) having a nitrogen atom, the rub resistance of the image was satisfactory, but the ink removability was degraded. The reason for this was considered to be that the effect of improving the ink removability due to the moisturizing effect of the organic solvent (C) was not obtained.

In Comparative Example 4 in which the content mass ratio [the organic solvent (C)/the main resin in the resin (B)] in the ink was less than 0.01, the rub resistance and the ink removability of the image were degraded. The reason why the rub resistance of the image was degraded was considered that since the amount of the organic solvent (C) was extremely small, the effect of improving the film-forming property from the organic solvent (C) was insufficient. Further, the reason why the ink removability was degraded was considered that since the effect of improving the ink removability due to the moisturizing effect of the organic solvent (C) was insufficient.

In Comparative Example 5 in which TEA having a boiling point of higher than 250° C. was used in place of the organic solvent (C), the drying properties of the image were degraded and the rub resistance of the image was degraded.

As shown in the results of Examples 1, 9, and 11, it was found that in a case where the boiling point of the organic solvent (C) was 200° C. or lower (Examples 1 and 9), the rub resistance of the image was further improved.

As shown in the results of Examples 1 to 6, it was found that in a case where the content mass ratio [the organic solvent (C)/the main resin in the resin (B)] was in a range of 0.01 to 1.0 (Examples 1 and 2), the rub resistance and the ink removability of the image were further improved.

As shown in the results of Examples 1 and 9, it was found that in a case where $|SP_C-SP_B|$ was 5.0 or less (Example 1), the rub resistance of the image was further improved.

As shown in the results of Examples 1 and 11, it was found that in a case where the organic solvent (C) contained a hydroxyl group (Example 1), the ink removability was further improved.

As shown in the results of Examples 1 and 10, it was found that in a case where the resin (B) contained resin particles (Example 1), the ink removability was further improved.

As shown in the results of Examples 1, 12, and 14, it was found that in a case where the ink contained the organic solvent (D) satisfying Expression (D1) (that is, "$|SP_D-SP_{CM}|\leq5.0$") (Example 1), the ink removability was further improved.

Example 101

<Preparation and Evaluation of Ink>

An ink having the following composition was prepared using the aqueous dispersion liquid of the acryl 1, a cyan pigment aqueous dispersion liquid, DMAE as the organic solvent (C), DPGmME as the organic solvent (D), PG as the organic solvent (E), and water.

Here, Pro-Jet Cyan APD3000 (manufactured by FUJIFILM Imaging Colorants Limited) was used as the cyan pigment aqueous dispersion liquid.

The prepared ink was a cyan ink containing Pigment Blue 15:3, which was a cyan organic pigment, as a colorant.

The same evaluations as the evaluations in Example 1 were performed using the ink. As the evaluation results, all items (that is, the adhesiveness of the image, the ink removability, and the drying properties of the image) were "A".

—Ink Composition—

Acryl 1 [resin particles formed of main resin in resin (B)] . . . 6.0% by mass
DMAE [organic solvent (C)] . . . 1.0% by mass
DPGmME [organic solvent (D)] . . . 1.0% by mass
Propylene glycol (PG) [organic solvent (E)] . . . 27% by mass
Pigment Blue 15:3 [colorant] . . . 3.0% by mass
Pigment dispersion resin [resin other than main resin in resin (B)] . . . 1.4% by mass
Water . . . remaining amount set such that total amount of composition was 100% by mass Example 102

<Preparation and Evaluation of Ink>

An ink having the following composition was prepared using the aqueous dispersion liquid of the acryl 1, a magenta pigment aqueous dispersion liquid, DMAE as the organic solvent (C), DPGmME as the organic solvent (D), PG as the organic solvent (E), and water.

Here, Pro-Jet Magenta APD3000 (manufactured by FUJIFILM Imaging Colorants Limited) was used as the magenta pigment aqueous dispersion liquid.

The prepared ink is a magenta ink containing Pigment Red 122, which is a magenta organic pigment, as a colorant.

The same evaluations as the evaluations in Example 1 were performed using the ink. As the evaluation results, all items (that is, the adhesiveness of the image, the ink removability, and the drying properties of the image) were "A".

—Ink Composition—

Acryl 1 [resin particles formed of main resin in resin (B)] . . . 6.0% by mass
DMAE [organic solvent (C)] . . . 1.0% by mass
DPGmME [organic solvent (D)] . . . 1.0% by mass
Propylene glycol (PG) [organic solvent (E)] . . . 27% by mass
Pigment Red 122 [colorant] . . . 5.0% by mass
Pigment dispersion resin [resin other than main resin in resin (B)] . . . 1.5% by mass
Water . . . remaining amount set such that total amount of composition was 100% by mass Example 103

<Preparation and Evaluation of Ink>

An ink having the following composition was prepared using the aqueous dispersion liquid of the acryl 1, a yellow pigment aqueous dispersion liquid, DMAE as the organic solvent (C), DPGmME as the organic solvent (D), PG as the organic solvent (E), and water.

Here, Pro-Jet Yellow APD3000 (manufactured by FUJIFILM Imaging Colorants Limited) was used as the yellow pigment aqueous dispersion liquid.

The prepared ink was a yellow ink containing Pigment Yellow 74, which was a yellow organic pigment, as a colorant.

The same evaluations as the evaluations in Example 1 were performed using the ink. As the evaluation results, all items (that is, the adhesiveness of the image, the ink removability, and the drying properties of the image) were "A".

—Ink Composition—

Acryl 1 [resin particles formed of main resin in resin (B)] . . . 6.0% by mass
DMAE [organic solvent (C)] . . . 1.0% by mass
DPGmME [organic solvent (D)] . . . 1.0% by mass
Propylene glycol (PG) [organic solvent (E)] . . . 27% by mass
Pigment Yellow 74 [colorant] . . . 4.0% by mass
Pigment dispersion resin [resin other than main resin in resin (B)] . . . 1.6% by mass
Water . . . remaining amount set such that total amount of composition was 100% by mass Example 104

<Preparation and Evaluation of Ink>

An ink having the following composition was prepared using the aqueous dispersion liquid of the acryl 1, a black pigment aqueous dispersion liquid, DMAE as the organic solvent (C), DPGmME as the organic solvent (D), PG as the organic solvent (E), and water.

Here, Pro-Jet Black APD3000 (manufactured by FUJIFILM Imaging Colorants Limited) was used as the black pigment aqueous dispersion liquid.

The prepared ink was a black ink containing carbon black, which was a black inorganic pigment, as a colorant.

The same evaluations as the evaluations in Example 1 were performed using the ink. As the evaluation results, all items (that is, the adhesiveness of the image, the ink removability, and the drying properties of the image) were "A".

—Ink Composition—
- Acryl 1 [resin particles formed of main resin in resin (B)] . . . 6.0% by mass
- DMAE [organic solvent (C)] . . . 1.0% by mass
- DPGmME [organic solvent (D)] . . . 1.0% by mass
- Propylene glycol (PG) [organic solvent (E)] . . . 27% by mass
- Carbon black [colorant] . . . 4.5% by mass
- Pigment dispersion resin [resin other than main resin in resin (B)] . . . 2.0% by mass
- Water . . . remaining amount set such that total amount of composition was 100% by mass

What is claimed is:

1. An inkjet ink composition which is used for recording an image on an impermeable base material, the inkjet ink composition comprising:
    water (A);
    a resin (B);
    an organic solvent (C) which has a boiling point of 250° C. or lower, satisfies Expression (C1), and has a nitrogen atom,
    wherein a content mass ratio of the organic solvent (C) to a main resin in the resin (B) is 0.01 or greater and less than 2.0, and the organic solvent (C) further contains a hydroxyl group, and
    an organic solvent (D) which satisfies Expression (D1) and has no nitrogen atom, $|SP_C - SP_B| \leq 10.0$  Expression (C1)

in Expression (C1), $SP_B$ represents an SP value of the main resin in the resin (B) in a unit of MPa$^{1/2}$, $SP_C$ represents an SP value of the organic solvent (C) in the unit of MPa$^{1/2}$, and $|SP_C - SP_B|$ represents an absolute value of a difference between $SP_C$ and $SP_B$, $|SP_D - SP_{CM}| \leq 5.0$  Expression (D1)

in Expression (D1), $SP_{CM}$ represents an SP value of a main organic solvent in the organic solvent (C) in the unit of MPa$^{1/2}$, $SP_D$ represents an SP value of the organic solvent (D) in the unit of MPa$^{1/2}$, and $|SP_D - SP_{CM}|$ represents an absolute value of a difference between $SP_D$ and $SP_{CM}$.

2. The inkjet ink composition according to claim 1, wherein the organic solvent (C) has a boiling point of 200° C. or lower.

3. The inkjet ink composition according to claim 1, wherein the content mass ratio of the organic solvent (C) to the main resin in the resin (B) is in a range of 0.01 or greater to 1.0 or less.

4. The inkjet ink composition according to claim 1, wherein $|SP_C - SP_B|$ is 5.0 or less.

5. The inkjet ink composition according to claim 1, wherein the resin (B) contains resin particles.

6. The inkjet ink composition according to claim 1, further comprising:
    a colorant.

7. The inkjet ink composition according to claim 1, wherein the resin (B) contains resin particles, and
    the organic solvent (C) has a boiling point of 200° C. or lower.

8. An image recording method comprising:
    recording an image by jetting and applying the inkjet ink composition according to claim 1 onto an impermeable base material from an ink jet head; and
    removing the inkjet ink composition attached to a surface of the ink jet head from which the inkjet ink composition is jetted.

9. The inkjet ink composition according to claim 1, further comprising:
    propylene glycol as an organic solvent (E) other than the organic solvent (C) and the organic solvent (D).

* * * * *